United States Patent
Kishigami et al.

(10) Patent No.: US 9,234,956 B2
(45) Date of Patent: Jan. 12, 2016

(54) RADAR DEVICE

(71) Applicant: PANASONIC CORPORATION, Osaka (JP)

(72) Inventors: Takaaki Kishigami, Tokyo (JP); Yoichi Nakagawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 315 days.

(21) Appl. No.: 14/114,135

(22) PCT Filed: Feb. 6, 2013

(86) PCT No.: PCT/JP2013/000638
§ 371 (c)(1),
(2) Date: Oct. 25, 2013

(87) PCT Pub. No.: WO2013/145526
PCT Pub. Date: Oct. 3, 2013

(65) Prior Publication Data
US 2014/0062763 A1 Mar. 6, 2014

(30) Foreign Application Priority Data
Mar. 29, 2012 (JP) ................................ 2012-078309

(51) Int. Cl.
*G01S 13/42* (2006.01)
*G01S 3/74* (2006.01)
(Continued)

(52) U.S. Cl.
CPC . *G01S 3/74* (2013.01); *G01S 13/42* (2013.01); *G01S 13/931* (2013.01); *G01S 13/284* (2013.01); *G01S 2007/2886* (2013.01)

(58) Field of Classification Search
CPC ......... G01S 3/74; G01S 13/931; G01S 13/42; G01S 13/284; G01S 2007/2886
USPC .......... 342/158, 133, 139, 145–147, 174, 194
See application file for complete search history.

(56) References Cited

U.S. PATENT DOCUMENTS 8,659,477 B2 * 2/2014 Fukagawa ............. G01S 13/765
342/458
9,134,405 B2 * 9/2015 Kishigami ............ G01S 7/2813
(Continued)

FOREIGN PATENT DOCUMENTS

| JP | 2008134223 A | 6/2008 |
|---|---|---|
| JP | 2010101694 A | 5/2010 |
| JP | 2010197138 A | 9/2010 |

OTHER PUBLICATIONS

Zhao Long, "Angle estimation with adaptive arrays in strong mainbeam interference fields," in Communications, Circuits and Systems, 2008. ICCCAS 2008. International Conference on , vol., No., pp. 862-865, May 25-27, 2008.*

(Continued)

*Primary Examiner* — John B Sotomayor
(74) *Attorney, Agent, or Firm* — Seed IP Law Group PLLC

(57) ABSTRACT

A transmission beam control unit 8 changes a main beam direction of a radar transmission beam every predetermined number of transmission periods. A radar transmitting unit Tx transmits a radar transmission signal using the radar transmission beam of which the main beam direction has been changed. In a radar receiving unit Rx, an estimation range selection unit 22 selects an estimation range of the direction of arrival of a reflected wave signal by limiting the estimation range to the approximate transmission beam width on the basis of the transmission beam width of the radar transmission beam and the output from the transmission beam control unit 8. The direction-of-arrival estimation unit 23 estimates the direction of arrival of the reflected wave signal on the basis of phase information between a plurality of antennas according to the selected range.

7 Claims, 17 Drawing Sheets

(51) Int. Cl.
*G01S 13/93* (2006.01)
*G01S 7/288* (2006.01)
*G01S 13/28* (2006.01)

(56) References Cited

U.S. PATENT DOCUMENTS

2008/0100499 A1  5/2008  Nishimura

2012/0161931 A1*  6/2012  Karmakar ............. G01S 13/753
                                                            340/10.1
2014/0062763 A1*  3/2014  Kishigami ............. G01S 13/42
                                                            342/158
2014/0327567 A1*  11/2014  Kishigami ............. G01S 13/91
                                                            342/146

OTHER PUBLICATIONS

International Search Report, mailed Mar. 26, 2013, for PCT/JP2013/000638, 2 pages.

\* cited by examiner

RADAR DEVICE

TECHNICAL FIELD

The present disclosure relates to a radar device that performs positioning on the basis of a reflected wave signal reflected by a target.

BACKGROUND ART

A radar device transmits a high-frequency radar transmission signal from a measurement point to a space, receives a reflected wave signal reflected by the target, and measures at least one of the distance between the measurement point and the target and a direction in which the target is present (direction of arrival). In recent years, development of a radar device that estimates a direction of arrival or a distance to the target including a vehicle and a pedestrian by performing high-resolution measurement using a radar transmission signal with a short wavelength including a microwave or a millimeter wave has been carried out.

The radar device receives mixed signals of respective reflected waves from a target present at a short distance and a target present at a long distance. A range side lobe occurs in the reflected wave signal from the target present at a short distance. When the range side lobe and the main lobe of the reflected wave signal from the target present at a long distance are mixed, the detection accuracy of the target present at a long distance is degraded.

Therefore, it is required for the radar device, for which high-resolution measurement is required for a plurality of targets, to transmit a pulse wave or a pulse modulated wave using a transmission code having an autocorrelation characteristic for a low range side lobe level (hereinafter, referred to as a "low range side lobe characteristic").

When a vehicle and a pedestrian are present at the same distance from the measurement point, the radar device receives mixed signals of respective reflected wave signals from the vehicle and the pedestrian whose radar cross sections (RCS) are different. The radar cross section of the pedestrian is smaller than the radar cross section of the vehicle. That is, the signal level of the reflected wave signal changes with the distance or type of the target.

In contrast, even if a vehicle and a pedestrian are present at the same distance from the measurement point, the radar device is required to properly receive the respective reflected wave signals from the vehicle and the pedestrian. For this reason, the radar device is required to have a wide receiving dynamic range to the extent of receiving reflected wave signals having various signal levels.

For example, PTL 1 is known as a related art to detect a plurality of targets simultaneously with high azimuth resolution using a small number of antennas.

CITATION LIST

Patent Literature

[PTL 1] JP-A-2010-101694

SUMMARY OF INVENTION

Technical Problem

In the azimuth detector disclosed in PTL 1, however, scan time of the azimuth detector within the azimuth detection range is equivalent to the product of transmission null scan time and reception null scan time, resulting in a large amount of time.

The present disclosure has been made in view of the above situation in the related art, and it is an object of the present disclosure to provide a radar device for improving the estimation accuracy of the direction of arrival of a plurality of targets within a distance resolution using a limited number of antennas without increasing the scan time within the azimuth detection range.

According to one aspect of the invention, there is provided a radar device, including:

a transmission beam control unit configured to output a control signal indicating a main beam direction of a radar transmission beam changing every predetermined number of transmission periods;

a radar transmitting unit configured to transmit a radar transmission signal using the radar transmission beam of which the main beam direction has been changed on the basis of the control signal; and a radar receiving unit configured to estimate, using a plurality of antenna system processing units that receive a reflected wave signal obtained by reflection of the radar transmission signal from a target, a direction of arrival of the reflected wave signal from the target, wherein the radar receiving unit includes:

an inter-antenna correlation calculation unit configured to generate phase difference information due to arrangement of receiving antennas on the basis of outputs from the plurality of antenna system processing units;

an estimation range selection unit configured to select an estimation range of the direction of arrival of the reflected wave signal on the basis of the control signal and a transmission beam width of the radar transmission beam; and a direction-of-arrival estimation unit configured to estimate a direction of arrival of the reflected wave signal from the target on the basis of each output of the inter-antenna correlation calculation unit and the estimation range selection unit.

Advantageous Effects of Invention

According to the present disclosure, the estimation accuracy of the direction of arrival of a plurality of targets within the distance resolution can be improved using a limited number of antennas without increasing the scan time within the azimuth detection range.

BRIEF DESCRIPTION OF DRAWINGS

FIG. 10A shows a case where a scan of the transmission beam is not performed, FIG. 10B shows a case where a scan of the radar transmission beam is performed but the estimation range is not selected according to the main beam direction of the radar transmission beam, and FIG. 10C shows a case where there is the scan of the radar transmission beam and the estimation range is selected according to the main beam direction of the radar transmission beam.

DESCRIPTION OF EMBODIMENTS

Figure 1A:
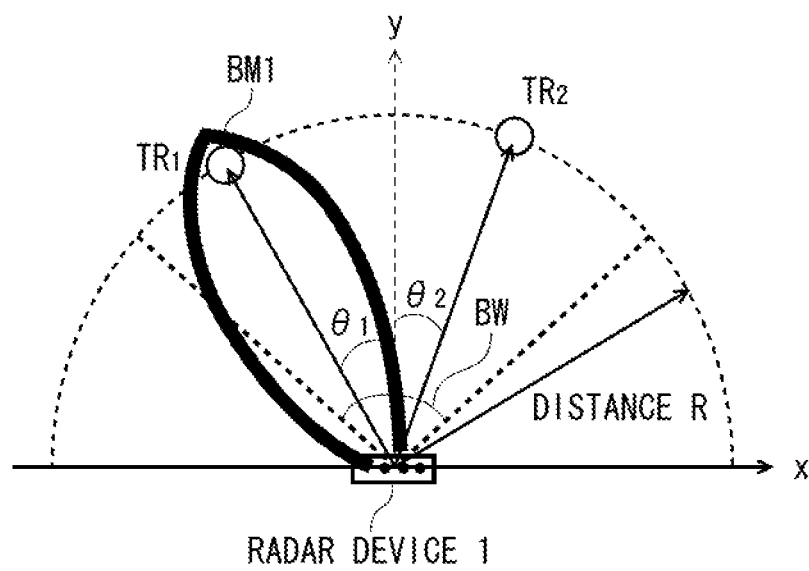
FIG. 1A is a diagram showing a radar transmission beam BM1 radiated toward a target present in a direction of azimuth angle $\theta_1$ of a plurality of targets present within the distance resolution.

Prehistory of the Contents of Each Embodiment

First, before describing each embodiment of the radar device according to the present disclosure, prehistory of the contents of each embodiment will be described.

As an example of the conventional radar device, a radar device is known which detects an angular direction in which a target is present (angle measurement) by transmitting a pulse wave or a pulse modulated wave by mechanically scanning a transceiver antenna or electronically scanning a directional beam of a narrow angle (for example, beam width of about 1° or 2°) and estimating the arrival distance (distance measurement) to the target and the direction of arrival of the reflected wave signal from the target on the basis of the reflected wave signal reflected by the target.

In addition, as another example of the conventional radar device, a radar device is known which detects an angular direction in which a target is present (angle measurement) by receiving a reflected wave signal reflected from the target through an array antenna and estimating the direction of arrival with higher resolution than the directivity of the beam of each antenna by measuring the reception phase difference between the reflected wave signals from the target received by the array antenna (a plurality of antennas).

In the former radar device, it is necessary to scan a predetermined detection range using a directional beam of narrow angle (for example, beam width of about 1° or 2°). Accordingly, scan time of the antenna in target detection increases as the detection range increases. For this reason, in order to detect a target moving at high speed, it is difficult to detect the target so as to follow the movement of the target. In addition, in order to realize the directivity of narrow angle, it is necessary to increase an aperture length of the array antenna. In this case, the antenna size is increased.

In the latter radar device, an angular direction in which the target is present (angle measurement) can be estimated with high resolution using the reception phase difference between the reflected wave signals from the target received by a plurality of antennas. Accordingly, even if the scan interval is made more sparse, it is possible to estimate the direction of arrival with high resolution by signal processing. As a result, even if a target moves at high speed, it is possible to estimate an angle of arrival following the movement of the target.

In addition, since an antenna directivity of the array antenna that can cover the detection range is preferable, the directivity of an angle is needed to be wider than that in the former radar device. In this case, since the aperture length of the array antenna can be made smaller than that in the former radar device, the antenna size is reduced. Therefore, the following explanation will be focused on the configuration of the latter radar device.

A distance resolution ΔR in the radar device of the pulse width Tp will be described. The distance resolution ΔR is expressed as in Expression (1). A plurality of targets separated from each other by the distance resolution ΔR or more are separated so that processing for distance estimation or direction-of-arrival estimation is possible. Here, C is the speed of light.

On the other hand, when a plurality of targets having different angular directions as directions of arrival are present within the distance resolution ΔR and there are reflected wave signals equal to or greater than the number of receiving array antenna elements of the radar device, null formation exceeding the degree of freedom of the antenna is required if a known high-resolution estimation method (for example, Capon or MUSIC) is used. Accordingly, the estimation accuracy of the radar device is degraded.

[Expression 1]

$$\Delta R = \frac{CTp}{2} \quad (1)$$

Figure 17A:
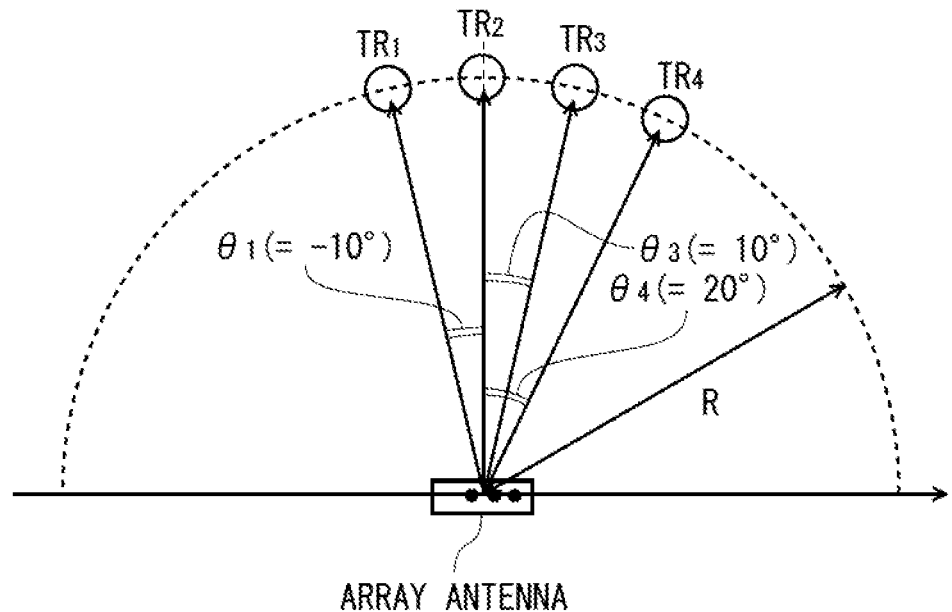
FIG. 17A is an explanatory view showing the arrangement relationship between a radar device using a receiving array antenna, in which the number of antenna elements is 4, and four targets present at positions at the same distance R from the radar device with different angles.
Figure 17B:
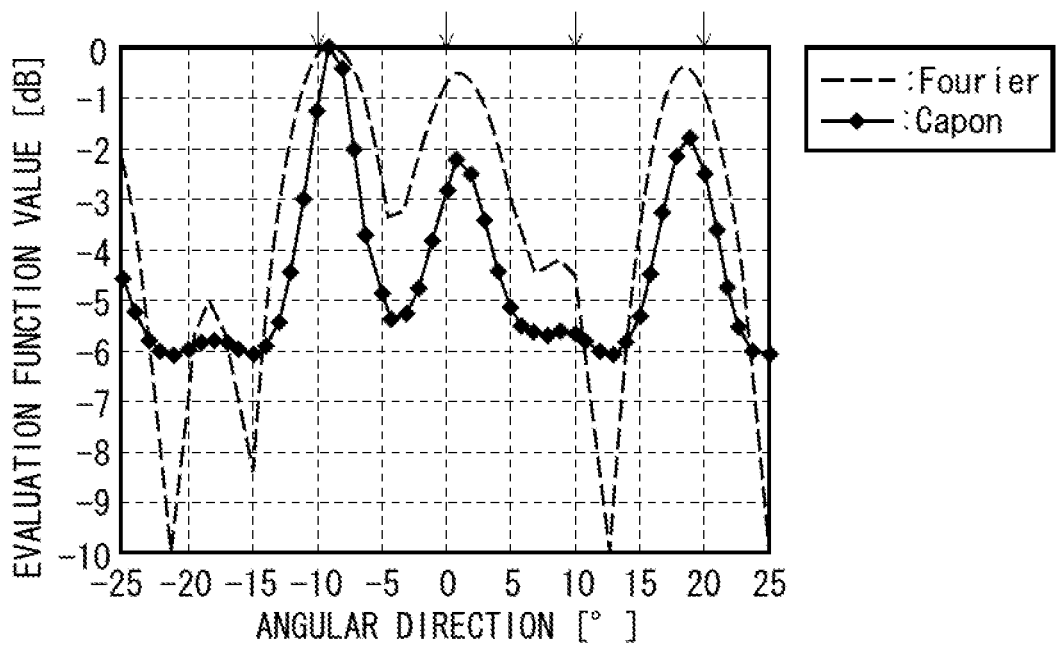
FIG. 17B is a graph showing the estimation simulation result of the directions of arrival of four targets, which are present at positions at the same distance R with different angles, in the radar device in which the number of antenna elements of the receiving array antenna is 4.

FIG. 17A is an explanatory view showing the arrangement relationship between a radar device using a receiving array antenna, in which the number of antenna elements is 4, and four targets $TR_1$, $TR_2$, $TR_3$, and $TR_4$ present at positions at the same distance R from the radar device with different angles. FIG. 17B is a graph showing the estimation simulation result of the directions of arrival of the four targets $TR_1$, $TR_2$, $TR_3$, and $TR_4$, which are present at positions at the same distance R with different angles, in the radar device in which the number of antenna elements of the receiving array antenna is 4. In FIG. 17B, the horizontal axis indicates a direction of arrival, and the vertical axis indicates an evaluation function value of the direction of arrival for the direction of arrival on the horizontal axis, and the peak direction of the evaluation function value corresponds to the direction of arrival of the target. In addition, in order to estimate the direction of arrival, a Fourier transform and Capon are used as an example of the known high-resolution estimation method.

In FIG. 17B, the levels of the reflected wave signals from the four targets $TR_1$, $TR_2$, $TR_3$, and $TR_4$ present at the positions at the same distance R with different angles are almost the same, and the true values of the directions of arrival of the reflected wave signals from the four targets are $-10°$, $0°$, $10°$, and $20°$.

The direction-of-arrival estimation result deviates from the true value of the direction of arrival of each target by about 3°, for example. In addition, an estimate in which a clear peak is not formed (for example, an angle-of-arrival estimate for the target $TR_3$) is also present. Thus, when the number of targets present at different positions at the same distance R is equal to or greater than the number of antenna elements, the estimation accuracy of the radar device is degraded.

For example, PTL 1 is known as a related art to simultaneously detect a plurality of targets shown in FIG. 17A with high lateral resolution using a small number of antennas. The azimuth detector disclosed in PTL 1 has one null as each directivity pattern of the transmission beam and the reception beam, and measures received power by transmitting and receiving a probe wave by sequentially changing the transmission null direction and the reception null direction independently within the azimuth detection range. The azimuth detector extracts a combination of the transmission null direction and the reception null direction in which the received power is minimized, and detects the reception null direction and the transmission null direction, which have been extracted, as azimuthal directions in which separate targets are present.

However, the azimuth detector disclosed in PTL 1 detects the azimuthal direction of the target by independently controlling the directivity pattern of each of the transmission beam and the reception beam within the azimuth detection range. For this reason, scan time of the azimuth detector within the azimuth detection range is equivalent to the product of transmission null scan time and reception null scan time, resulting in a large amount of time.

The reception null scan time can be shortened by introduction of parallel processing using digital signal processing, but the same scan time as in the above-described beam scan of narrow angle (for example, about 1° or 2°) is required as the transmission null scan time. Accordingly, since the target detection time is increased, the ability to follow the detection of a target moving at high speed is degraded.

Therefore, in each of the following embodiments, an example of a radar device for improving the estimation accuracy of the direction of arrival of a plurality of targets within the distance resolution using a limited number of antennas without increasing the scan time within the azimuth detection range will be described.

Hereinafter, each embodiment of the radar device according to the present disclosure will be described with reference to the drawings.

First Embodiment

Figure 1B:
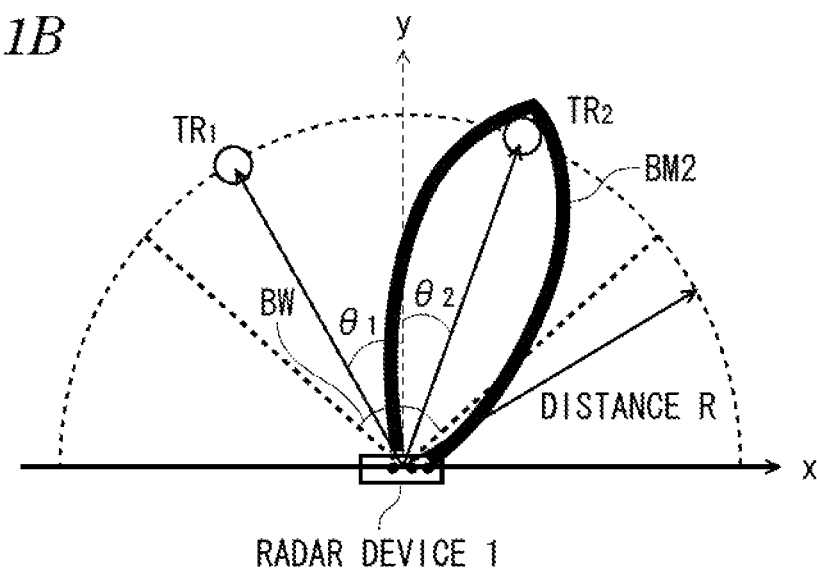
FIG. 1B is a diagram showing a radar transmission beam BM2 radiated toward a target present in a direction of azimuth angle $\theta_2$ of a plurality of targets present within the distance resolution.
Figure 2:
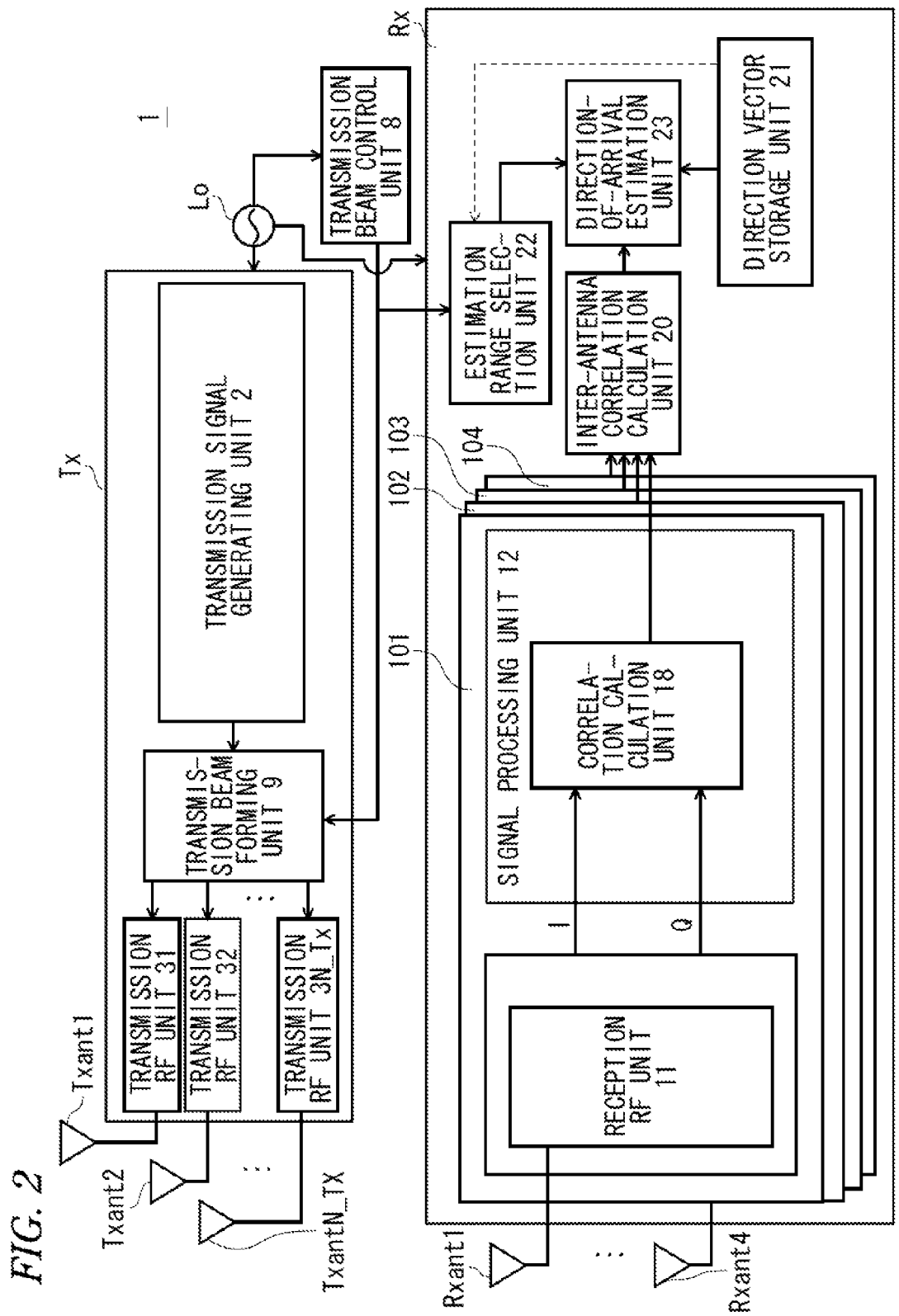
FIG. 2 is a block diagram schematically showing the internal configuration of a radar device of a first embodiment.
Figure 3:
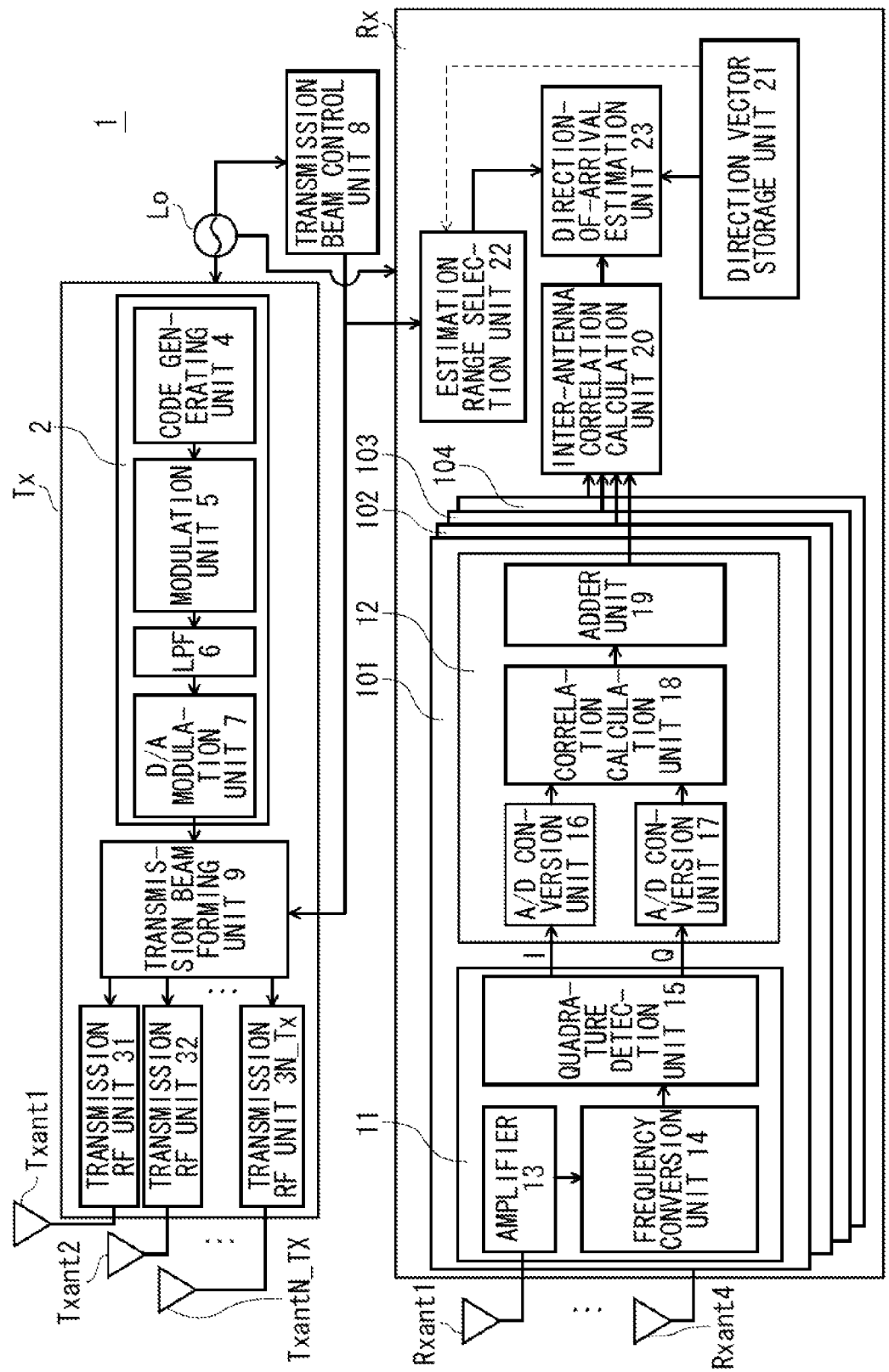
FIG. 3 is a block diagram showing the detailed internal configuration of the radar device of the first embodiment.

The outline of the operation and configuration of a radar device 1 of a first embodiment will be described with reference to FIGS. 1A to 3. FIG. 1A is a diagram showing a radar transmission beam BM1 radiated toward a target present in a direction of azimuth angle $\theta_1$ of a plurality of targets present within the distance resolution. FIG. 1B is a diagram showing a radar transmission beam BM2 radiated toward a target present in a direction of azimuth angle $\theta_2$ of a plurality of targets present within the distance resolution. FIG. 2 is a block diagram schematically showing the internal configuration of the radar device 1 of the first embodiment. FIG. 3 is a block diagram showing the internal configuration of the radar device 1 of the first embodiment in detail.

For a plurality (for example, two) of targets $TR_1$ and $TR_2$ present within the distance resolution $\Delta R$ of the radar device 1 shown in Expression (1), the radar device 1 changes a main beam direction $\theta$ of the radar transmission beam at predetermined distances $\Delta\theta$ within the range of the defined transmission beam width BW. The radar device 1 sequentially transmits the radar transmission beam of the main beam direction $\theta$ by performing a sequential scan of the main beam direction $\theta$ of the radar transmission beam within the range of the transmission beam width BW.

In FIG. 1A, the radar device 1 transmits the radar transmission beam BM1 of the main beam direction $\theta_1$. Similarly, in FIG. 1B, the radar device 1 transmits the radar transmission beam BM2 of the main beam direction $\theta_2$. In addition, for simplicity of explanation, in FIGS. 1A and 1B, absolute values of the azimuth angle from the y-axis direction when the position of the radar device 1 is set as the origin are set to $\theta_1$ and $\theta_2$.

The radar device 1 forms a radar transmission beam having the predetermined direction $\theta$ as a main beam direction using a transmission signal generated by a radar transmitting unit Tx, which includes "N_Tx" transmission RF units and "N_Tx" transmission antennas, and receives a reflected wave signal, which is a signal obtained when the radar transmission beam is reflected by the target (for example, target $TR_1$), through an array antenna. The radar device 1 estimates the direction of arrival of the reflected wave signal, that is, the presence direction of the target $TR_1$ with respect to the radar device 1 as a reference by performing signal processing on the signal received through the array antenna. N_Tx is a predetermined natural number.

In addition, the targets $TR_1$ and $TR_2$ are target objects to be detected by the radar device 1, and include a vehicle or a person, for example. This is the same as in each of the following embodiments.

First, the configuration of each unit of the radar device 1 will be briefly described.

The radar device 1 shown in FIG. 2 includes a reference signal oscillator Lo, a transmission beam control unit 8, a radar transmitting unit Tx, and a radar receiving unit Rx. The radar transmitting unit Tx has a transmission signal generating unit 2, a transmission beam forming unit 9, and transmission RF units 31 to 3N_Tx to which "N_Tx" transmission antennas Txant1 to TxantN_Tx are connected.

The reference signal oscillator Lo is connected to the transmission beam control unit 8, the radar transmitting unit Tx, and the radar receiving unit Rx. The reference signal oscillator Lo supplies a common reference signal to the transmission beam control unit 8, the radar transmitting unit Tx, and the radar receiving unit Rx to make the processes of the transmission beam control unit 8, the radar transmitting unit Tx, and the radar receiving unit Rx synchronized with each other.

The radar receiving unit Rx has, for example, four antenna system processing units 101, 102, 103, and 104, an inter-antenna correlation calculation unit 20, a direction vector storage unit 21, an estimation range selection unit 22, and a direction-of-arrival estimation unit 23. Although the radar receiving unit Rx shown in FIG. 2 has four antenna system processing units, the number of antenna system processing units may be 2 or more without being limited to 4. Since the antenna system processing units have the same configuration, the antenna system processing unit 101 will be described as an example in each of the following embodiments.

The antenna system processing unit 101 has a reception RF unit 11, to which a receiving antenna Rxant1 is connected, and a signal processing unit 12. The signal processing unit 12 has at least a correlation calculation unit 18.

Next, the configuration of each section of the radar transmitting unit Tx will be described in detail with reference to FIG. 3.

The radar transmitting unit Tx shown in FIG. 3 has the transmission signal generating unit 2, the transmission beam forming unit 9, the transmission RF unit 31 to which the transmission antenna Txant1 is connected, the transmission RF unit 32 to which the transmission antenna Txant2 is connected, ..., and the transmission RF unit 3N_Tx to which the transmission antenna TxantN_Tx is connected. The number of transmission antennas and the number of transmission RF units are N_Tx, and correspond to each other in a one-to-one manner.

The transmission signal generating unit 2 has a code generating unit 4, a modulation unit 5, a low pass filter (LPF) 6, and a digital analog (D/A) converter 7. In FIG. 3, the LPF 6 may be provided outside the transmission signal generating unit 2, and the output of the LPF 6 is input to the D/A modulation unit 7.

Each of the transmission RF units 31 to 3N_Tx includes a frequency conversion unit and an amplifier (not shown).

Next, the operation of each section of the transmission beam control unit 8 and the radar transmitting unit Tx will be described in detail.

The transmission signal generating unit 2 generates a transmission reference clock signal, which is obtained by multiplying a reference signal a predetermined number of times, on the basis of the reference signal generated by the reference signal oscillator Lo. Each section of the transmission signal generating unit 2 operates on the basis of the generated transmission reference clock signal.

Figure 4:
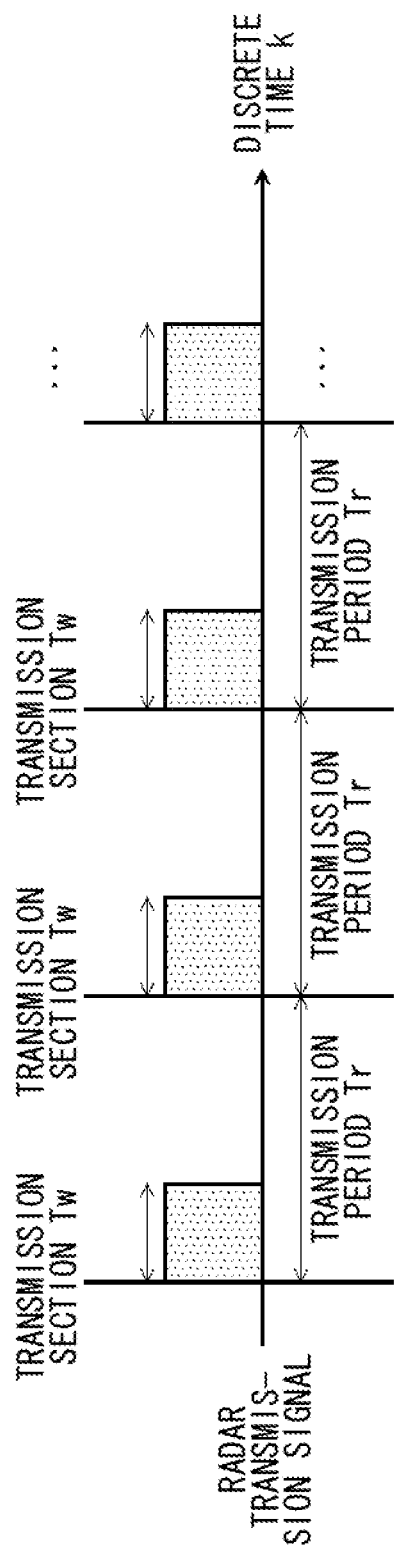
FIG. 4 is a diagram showing the relationship between a transmission section and a transmission period of the radar transmission beam.

The transmission signal generated by the transmission signal generating unit 2 is modulated using "No" samples of the transmission reference clock signal per code of a code sequence $C_n$ of the code length L, for example, in a transmission section Tw [seconds] of the transmission period Tr shown in FIG. 4. Here, n is 1 to L. FIG. 4 is a diagram showing the relationship between the transmission section Tw and the transmission period Tr of the radar transmission signal. The sampling rate in the transmission signal generating unit 2 is (No×L)/Tw, and the transmission signal is modulated using Nr (=No×L) samples in the transmission section Tw [seconds]. In a non-signal section (Tr−Tw) [seconds] of each transmission period Tr, the transmission signal is modulated using "Nu" samples.

The transmission signal generating unit 2 generates periodically a baseband transmission signal r(k, M) shown in Expression (2) by the modulation of the code sequence $C_n$ of the code length L. n is 1 to L, and L indicates the code length of the code sequence $C_n$. j is an imaginary unit satisfying $j^2=-1$. In addition, time k is a discrete time with the start timing of the radar transmission period (Tr) as a reference (k=1; k is a value from 1 to (Nr+Nu)), and is a discrete time indicating the modulation timing for the generation of a transmission signal.

M indicates the ordinal number of the transmission period Tr of the radar transmission beam. The transmission signal r(k, M) indicates a transmission signal at discrete time k of the M-th transmission period Tr, and is an addition result of an in-phase signal component I(k, M) and a quadrature signal component Q(k, M) multiplied by the imaginary unit j (refer to Expression (2)).

[Expression 2]

$$r(k,M)=I(k,M)+jQ(k,M) \quad (2)$$

The code generating unit 4 generates a transmission code of the code sequence $C_n$ of the code length L every transmission period Tr. Elements of the code sequence $C_n$ are configured using, for example, two values of [−1, 1] or four values of [1, −1, j, −j]. In order to make the radar device 1 have a low range side lobe characteristic, it is preferable that the transmission code be a code including at least one of a code sequence that forms a pair of complementary codes, a Barker code sequence, a Golay code sequence, an M sequence code, and a code sequence that forms a Spano code. The code generating unit 4 outputs the transmission code of the generated code sequence $C_n$ to the modulation unit 5. Hereinafter, the transmission code of the code sequence $C_n$ will be written as the transmission code $C_n$ for the sake of convenience.

In order to generate the pair of complementary codes (for example, the Golay code sequence and the Spano code sequence) as the transmission code $C_n$, the code generating unit 4 generates transmission codes $P_n$ and $Q_n$, which become a pair alternately every transmission period, using two transmission periods (2 Tr). That is, the code generating unit 4 generates one transmission code $P_n$ of the pair of complementary codes and outputs the generated transmission code $P_n$ to the modulation unit 5 in the M-th transmission period, and generates the other transmission code $Q_n$ of the pair of complementary codes and outputs the generated transmission code $Q_n$ to the modulation unit 5 in the next (M+1)-th transmission period. Similarly, in transmission periods from the (M+2)-th transmission period, the code generating unit 4 generates the transmission codes $P_n$ and $Q_n$ repeatedly with two transmission periods of the M-th and (M+1)-th transmission periods as a unit and outputs the generated transmission codes $P_n$ and $Q_n$ to the modulation unit 5.

The transmission code $C_n$ output from the code generating unit 6 is input to the modulation unit 5. The modulation unit 5 performs pulse modulation of the input transmission code $C_n$ to generate the baseband transmission signal r(k, M) shown in Expression (2). The pulse modulation is amplitude modulation, amplitude shift keying (ASK), or phase shift keying (PSK). This is the same as in each of the following embodiments.

For example, the phase shift keying (PSK) is binary phase shift keying (BPSK) in the phase modulation in which the code sequence $C_n$ is two values of, for example, [−1, 1], and is quadrature phase shift Keying (QPSK) or four-phase PSK in the phase modulation in which the code sequence $C_n$ is four values of, for example, [1, −1, j, −j]. That is, in the phase shift keying (PSK), a predetermined modulation symbol in the constellation on the IQ plane is assigned.

The modulation unit 5 outputs the transmission signal r(k, M) in a limited band or less set in advance, among the generated transmission signals r(k, M), to the D/A modulation unit 7 through the LPF 6. In addition, the LPF 6 may be omitted in the transmission signal generating unit 2 or may be located after the D/A modulation unit 7. This is the same as in each of the following embodiments.

The D/A modulation unit 7 converts the digital transmission signal r(k, M) output from the modulation unit 5 into an analog transmission signal. The D/A modulation unit 7 outputs the analog transmission signal to the transmission beam forming unit 9.

Figure 8:
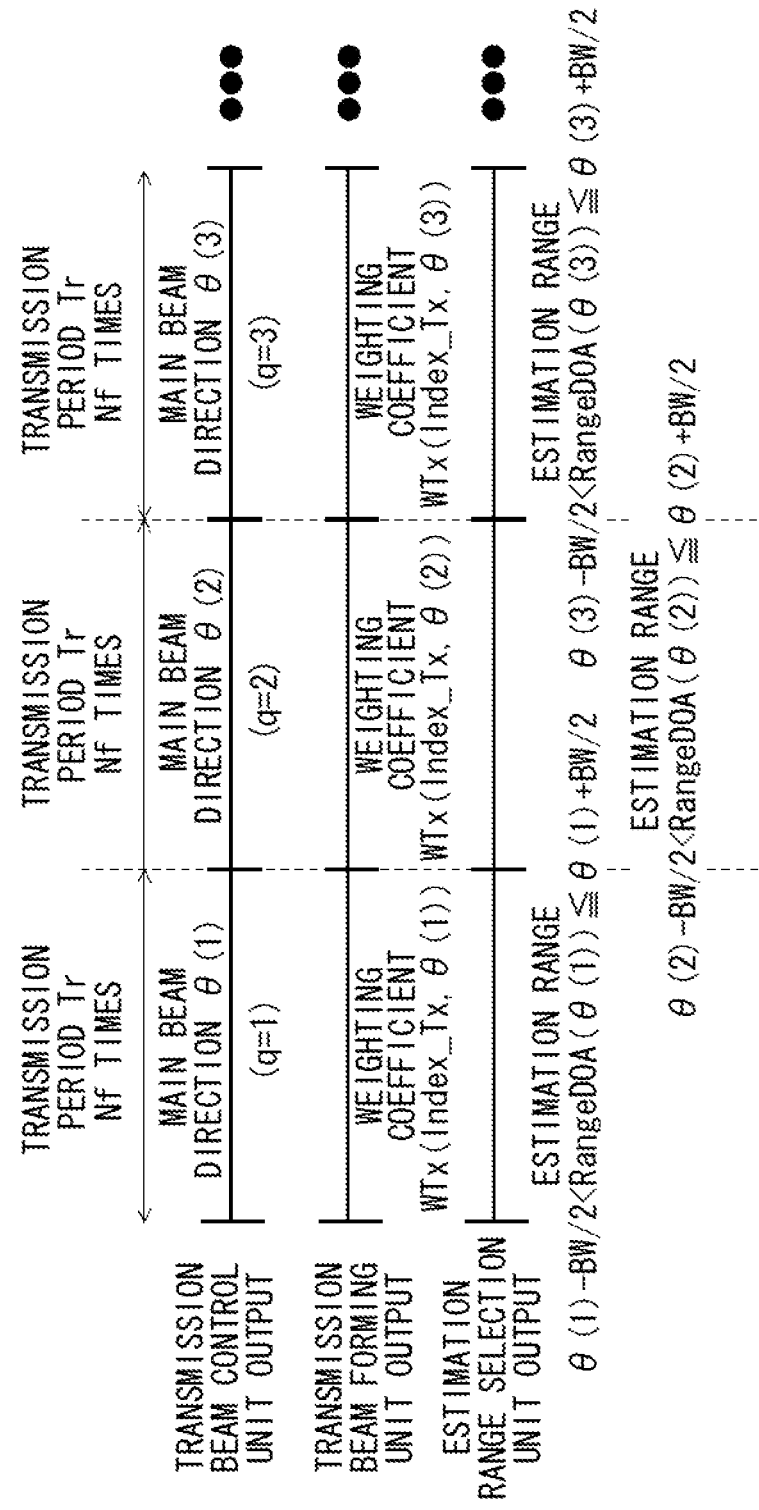
FIG. 8 is a diagram showing the relationship between the transmission period and each output of a transmission beam control unit, a transmission beam forming unit, and an estimation range selection unit.

The transmission beam control unit 8 controls the main beam direction θ of the radar transmission beam transmitted from the radar transmitting unit Tx. Specifically, the transmission beam control unit 8 changes the main beam direction θ of the radar transmission beam at predetermined distances Δθ within the transmission beam variable range (refer to Expression (3)), which is set in advance, every "Nf" (predetermined natural number) transmission periods Tr (refer to FIG. 8). FIG. 8 is a diagram showing the relationship between the transmission period and each output of the transmission beam control unit 8, the transmission beam forming unit 9, and the estimation range selection unit 22. Δθ is, for example, about 3° to 10°. θmin is the minimum value of the transmission beam variable range, and θmax is the maximum value of the transmission beam variable range. The transmission beam control unit 8 gives an instruction based on a control signal (outputs a control signal), which indicates that the main beam direction of the radar transmission beam is set to θ, to the transmission beam forming unit 9 and the estimation range selection unit 22.

[Expression 3]

$$\theta_{min} \le \theta \le \theta_{max} \quad (3)$$

In FIG. 8, the transmission beam control unit 8 gives an instruction based on a control signal, which indicates that the main beam direction of the radar transmission beam is set to θ(1), to the transmission beam forming unit 9 and the estimation range selection unit 22 during the first "Nf" transmission periods Tr (Nf×Tr).

In addition, the transmission beam control unit 8 gives an instruction based on a control signal, which indicates that the main beam direction of the radar transmission beam is set to θ(2), to the transmission beam forming unit 9 and the estimation range selection unit 22 during the second "Nf" transmission periods Tr (Nf×Tr).

In addition, the transmission beam control unit 8 gives an instruction, which indicates that the main beam direction of the radar transmission beam is set to θ(3), to the transmission beam forming unit 9 and the estimation range selection unit 22 during the first "Nf" transmission periods Tr (Nf×Tr).

The transmission beam forming unit 9 forms a transmission beam of the main beam direction θ output from the transmission beam control unit 8 on the basis of the transmission signal r(k, M) output from the D/A modulation unit 7. Specifically, the transmission beam forming unit 9 multiplies the transmission signal r(k, M) output from the D/A modulation unit 7 by the weighting coefficient WTx (Index_Tx, θ(q)) having a total of "N_Tx" elements of first to (N_Tx)-th elements. When the transmission antennas Txant1 to Txant-N_Tx are arranged at equal distances and the distance between the elements is d, the weighting coefficient WTx (Index_Tx, θ(q)) is expressed as in Expression (4). λ is the wavelength of the radar transmission beam. In addition, as examples of the antenna arrangement, linear arrangement, circular arrangement, and elliptical arrangement can be considered.

[Expression 4]

$$WTx(\text{Index\_Tx}, \theta(q)) = [\exp[j2\pi((\text{Index\_Tx})-1)d \sin \theta(q)/\lambda]] \quad (4)$$

The transmission beam forming unit 9 outputs a total of "N_Tx" transmission signals, which are multiplied by the weighting coefficient having a total of "N_Tx" elements, to the transmission RF units 31 to 3N_Tx matching the ordinal number (Index_Tx) of the elements of the weighting coefficient. Index_Tx is a natural number from 1 to N_Tx.

In FIG. 8, the transmission beam forming unit 9 multiplies the transmission signal r(k, M) output from the D/A modulation unit 7 by the weighting coefficient WTx (Index_Tx, θ(1)) in synchronization with the instruction from the transmission beam control unit 8 during the first "Nf" transmission periods (Nf×Tr).

In addition, the transmission beam forming unit 9 multiplies the transmission signal r(k, M) output from the D/A modulation unit 7 by the weighting coefficient WTx (Index_Tx, θ(2)) in synchronization with the instruction from the transmission beam control unit 8 during the second "Nf" transmission periods (Nf×Tr).

In addition, the transmission beam forming unit 9 multiplies the transmission signal r(k, M) output from the D/A modulation unit 7 by the weighting coefficient WTx (Index_Tx, θ(3)) in synchronization with the instruction from the transmission beam control unit 8 during the third "Nf" transmission periods (Nf×Tr).

In addition, the transmission beam forming unit 9 may reduce the side lobe level of the radar transmission beam of the main beam direction θ output from the transmission beam control unit 8 by forming the radar transmission beam using a weighting coefficient including an amplitude component and a phase component. As a beam forming method for reducing the side lobe level, for example, Binomial Array, Chebyshev Array, and Taylor Array can be applied.

Figure 6A:
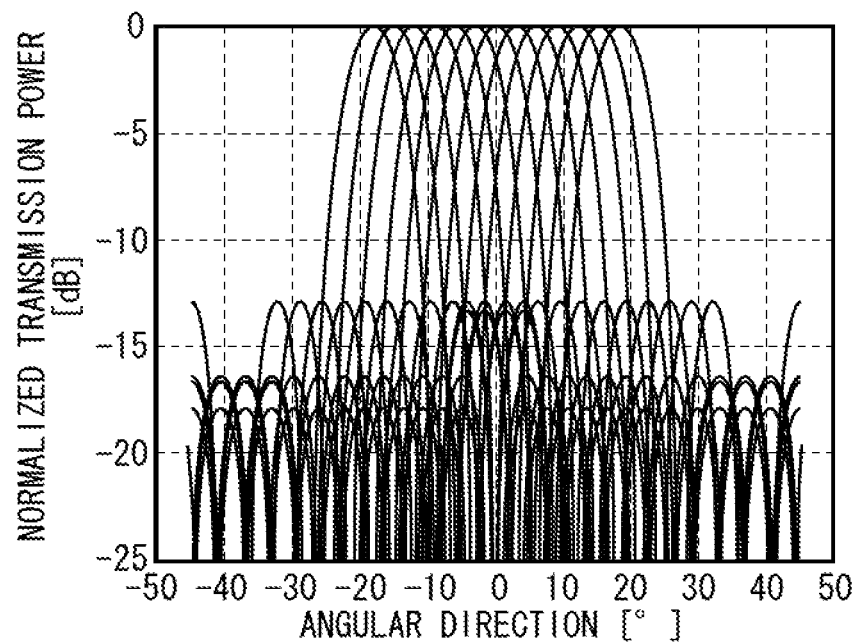
FIG. 6A is a graph showing an example of the scan pattern of the radar transmission beam.
Figure 6B:
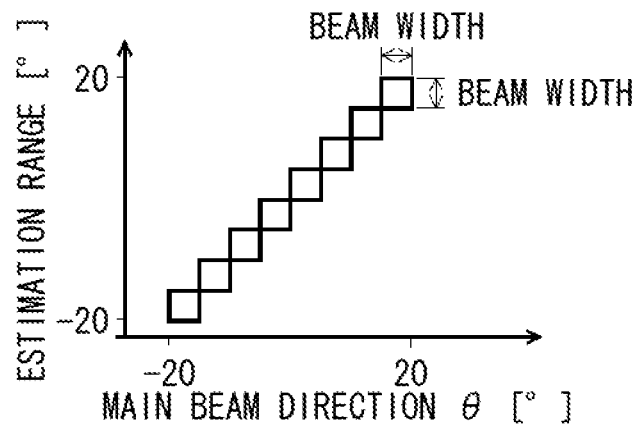
FIG. 6B is a diagram showing an example of the relationship between the estimation range and the scanning direction of the radar transmission beam.
Figure 6C:
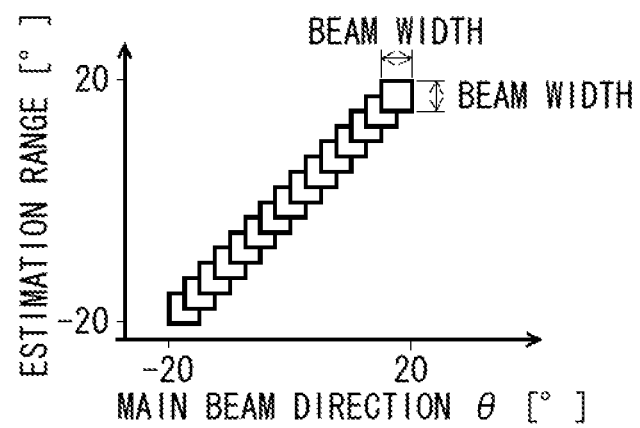
FIG. 6C is a diagram showing another example of the relationship between the estimation range and the scanning direction of the radar transmission beam.

FIG. 6A is a graph showing an example of the scan pattern of the radar transmission beam. FIG. 6B is a diagram showing an example of the relationship between the scanning direction and the estimation range of the transmission beam. FIG. 6C is a diagram showing another example of the relationship between the scanning direction and the estimation range of the transmission beam.

In FIG. 6A, scan patterns of the radar transmission beam when the scan interval Δθ of the radar transmission beam in the main beam direction θ is 3°, the scan range of the radar transmission beam is a range of −18° to +18°, the number of elements of transmission antennas is 8, and the distance between antennas in the transmission antenna array in a linear array arrangement is 0.8 times the wavelength of the transmission frequency are shown so as to overlap each other. In FIGS. 6B and 6C, the horizontal axis indicates a transmission beam direction [°] of the transmission beam, and the vertical axis indicates an estimation range [°] of the arrival azimuth angle of the reflected wave signal from the target in the radar receiving unit Rx for the main beam direction θ of the radar transmission beam.

In FIG. 6B, the value of a small square in the horizontal axis direction indicates a transmission beam width of the radar transmission beam in the main beam direction θ, the radar transmission beam is formed a total of 8 times in the scan range (for example, from −20° to 20°) of the radar transmission beam of the radar device 1, and the number of scans is 8. In addition, the value of the small square in the vertical axis direction indicates a range of estimation of the arrival azimuth angle that the radar receiving unit Rx performs for the target estimation range according to the formed radar transmission beam.

In FIG. 6C, the value of a small square in the horizontal axis direction indicates a transmission beam width of the radar transmission beam in the main beam direction θ, but the transmission beam width of the radar transmission beam partially overlaps the transmission beam width of the radar transmission beam of the next scan unlike in FIG. 6B. Therefore, in FIG. 6C, a radar transmission beam is formed a total of 15 times in the scan range (for example, from −20° to 20°) of the transmission beam of the radar device 1, and the number of scans is 15. Similarly, the value of the small square in the vertical axis direction indicates an estimation range of the arrival azimuth angle that the radar receiving unit Rx performs for the target estimation range according to the formed radar transmission beam.

In addition, the transmission beam forming unit 9 scans the transmission beam shown in FIG. 6B or 6C. The number of scans is increased by forming the radar transmission beam so that the transmission beam width of the radar transmission beam partially overlaps the transmission beam width of the radar transmission beam of the next scan, but the radar device 1 can smooth the transmission power in the azimuthal direction within the estimation range of the target. Therefore, it is possible to improve the estimation accuracy of the azimuthal direction.

Each of the transmission RF units 31 to 3N_Tx generates a transmission reference signal in a carrier frequency band, which is obtained by multiplying a reference signal a predetermined number of times, on the basis of the reference signal generated by the reference signal oscillator Lo. Each of the transmission RF units 31 to 3N_Tx operates on the basis of the generated transmission reference signal.

The (Index_Tx)-th transmission RF unit up-converts the baseband transmission signal into a high-frequency radar transmission signal using the transmission reference signal and the baseband transmission signal multiplied by the weighting coefficient WTx (Index_Tx, θ(q)).

The (Index_Tx)-th transmission RF unit amplifies the signal level of the radar transmission signal to a predetermined signal level, and outputs the result to the transmission antenna connected to the (Index_Tx)-th transmission RF unit. The amplified radar transmission signal is radiated into a space from the (Index_Tx)-th transmission antenna. In addition, a radar transmission beam in the main beam direction θ is formed by a total of "N_Tx" radar transmission signals transmitted from a total of "N_Tx" transmission antennas. The radar transmission beam shown in FIG. 4 is transmitted during the transmission section Tw of the transmission period Tr and is not transmitted during the non-signal section (Tr−Tw).

In addition, the reference signal generated by the reference signal oscillator Lo is input in common to the transmission RF units 31 to 3N_Tx and the reception RF units of the antenna system processing units 101, 102, 103, and 104. Each of the transmission RF units 31 to 3N_Tx operates on the basis of the transmission reference signal obtained by multiplying the reference signal a predetermined number of times, and each reception RF unit of the antenna system processing units 101, 102, 103, and 104 operates on the basis of the reception reference signal obtained by multiplying the reference signal the same predetermined number of times. Therefore, the processing of each of the transmission RF units 31 to 3N_Tx and the processing of each of the antenna system processing units 101, 102, 103, and 104 synchronize with each other.

Figure 5:
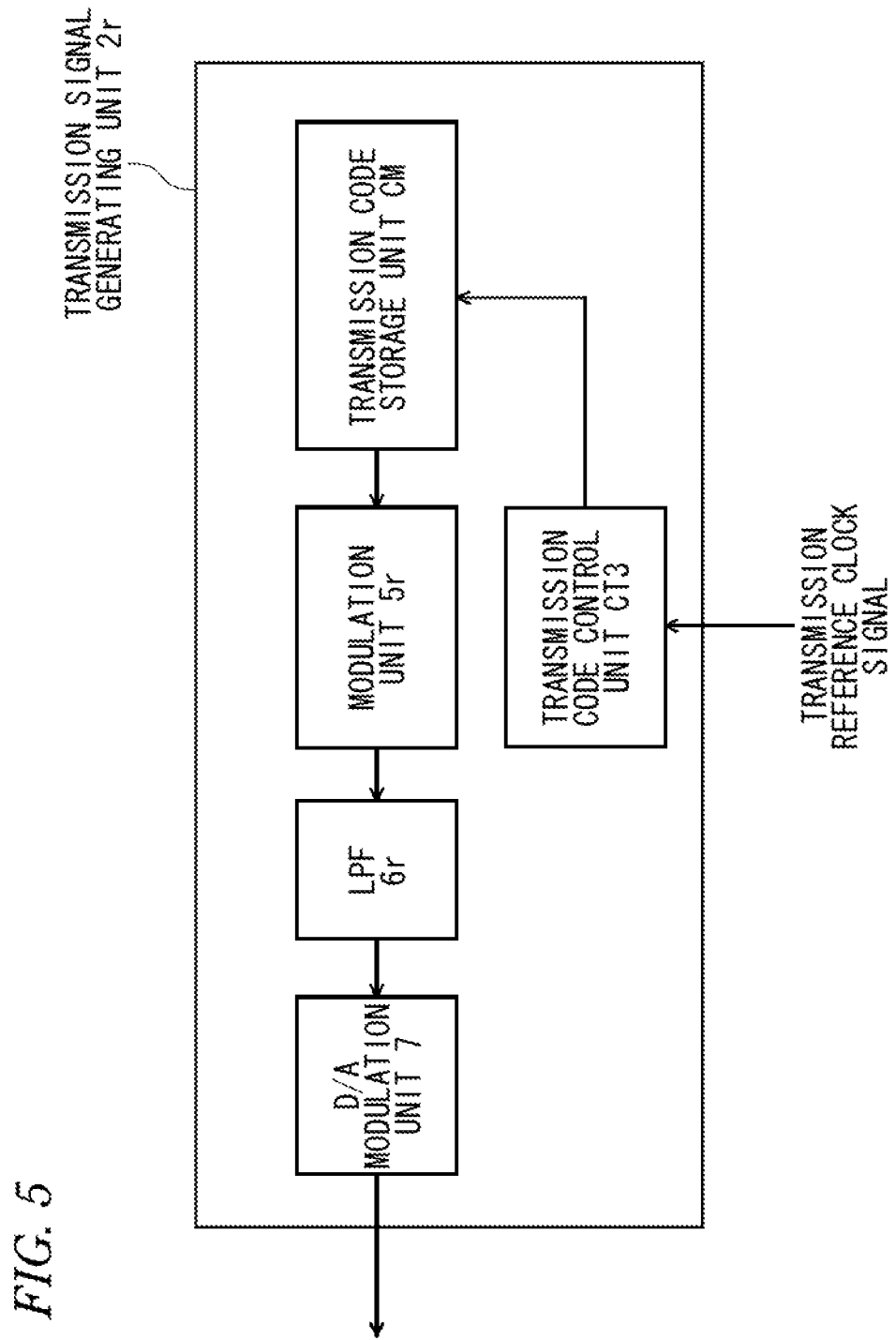
FIG. 5 is a block diagram showing the internal configuration of a transmission signal generating unit according to a modification example.

In addition, a transmission code storage unit CM that stores in advance the transmission code $C_n$ generated by the transmission signal generating unit 2 may be provided in the transmission signal generating unit 2 instead of providing the code generating unit 4 (refer to FIG. 5). FIG. 5 is a block diagram showing the internal configuration of the transmission signal generating unit 2 in a modification example. The transmission code storage unit CM may store a pair of complementary codes, for example, transmission codes $P_n$ and $Q_n$, for a case where the transmission signal generating unit 2 generates transmission codes as a pair of complementary codes. The transmission code storage unit CM is not limited to the present embodiment and can also be similarly applied to embodiments to be described later. A transmission signal generating unit 2r has the transmission code storage unit CM, a transmission code control unit CT3, a modulation unit 5r, an LPF 6r, and the D/A modulation unit 7.

The transmission code control unit CT3 cyclically reads the transmission code $C_n$ or the transmission codes $P_n$ and $Q_n$ as a pair of complementary codes from the transmission code storage unit CM every transmission period Tr on the basis of the transmission reference clock signal, which is obtained by multiplying the reference signal output from the reference signal oscillator Lo a predetermined number of times, and outputs the result to the modulation unit 5r. Since the operation after output to the modulation unit 5r is the same as the above-described operation of the modulation unit 5 and the LPF 6, explanation of the operation is omitted.

(Radar Receiving Unit)

Next, the configuration of each section of the radar receiving unit Rx will be described with reference to FIG. 3.

The radar receiving unit Rx shown in FIG. 3 has, for example, four antenna system processing units 101, 102, 103, and 104 provided corresponding to the number of receiving antennas that form the array antenna, the inter-antenna correlation calculation unit 20, the estimation range selection unit 22, the direction vector storage unit 21, and the direction-of-arrival estimation unit 23.

The antenna system processing unit 101 has the reception RF unit 11, to which the receiving antenna Rxant1 is connected, and the signal processing unit 12. The reception RF unit 11 has an amplifier 13, a frequency conversion unit 14, and a quadrature detection unit 15. The signal processing unit 12 has two A/D conversion units 16 and 17, a correlation calculation unit 18, and an adder unit 19. The radar receiving unit Rx calculates each transmission period Tr periodically as a signal processing unit in a signal processing unit of each antenna system processing unit.

Next, the operation of each section of the radar receiving unit Rx will be described in detail with reference to FIGS. 3 and 6 to 8.

The receiving antenna Rxant1 receives a reflected wave signal when the radar transmission beam transmitted from the radar transmitting unit Tx is reflected by the target. The reception signal received by the receiving antenna Rxant1 is input to the reception RF unit 11.

Similar to the transmission RF unit 3, the reception RF unit 11 generates a reception reference signal in a carrier frequency band, which is obtained by multiplying a reference signal a predetermined number of times, on the basis of the reference signal generated by the reference signal oscillator Lo. Each section of the reception RF unit 11 operates on the basis of the generated reception reference signal.

The high-frequency reception signal received by the receiving antenna Rxant1 is input to the amplifier 13, and the amplifier 13 amplifies the signal level of the input reception signal and outputs the result to the frequency conversion unit 14.

The reception signal output from the amplifier 13 is input to the frequency conversion unit 14, and the frequency conversion unit 14 down-converts the high-frequency reception signal using the input high-frequency reception signal and the reception reference signal. The frequency conversion unit 14 generates a baseband reception signal and outputs the generated reception signal to the quadrature detection unit 15.

The quadrature detection unit 15 performs quadrature detection of the reception signal output from the frequency conversion unit 14, thereby generating a reception signal formed by using an in-phase signal and a quadrate signal. The quadrature detection unit 15 outputs the in-phase signal of the generated reception signals to the A/D conversion unit 16, and outputs the quadrature signal to the A/D conversion unit 17.

The A/D conversion unit 16 converts the in-phase signal of analog data into digital data by sampling the baseband in-phase signal output from the quadrature detection unit 15 at each discrete time k. The A/D conversion unit 16 outputs the in-phase signal component of the converted digital data to the correlation calculation unit 18.

The A/D conversion unit 16 samples "Ns" signals per one pulse width (pulse period) Tp (=Tw/L) of the transmission signal r(k, M) generated by the radar transmitting unit Tx. That is, the sampling rate of the A/D conversion unit 16 is (Ns×L)/Tw=Ns/Tp, and the number of over-sampling per one pulse is Ns.

The A/D conversion unit 17 operates in the same manner as the A/D conversion unit 16 for the baseband quadrature signal output from the quadrature detection unit 15, and outputs the quadrature signal component of the converted digital data to the correlation calculation unit 18. In addition, the sampling rate of the A/D conversion unit 17 is Ns/Tp, and the number of over-sampling per one pulse is Ns.

Hereinafter, the reception signal at the discrete time k of the M-th transmission period Tr converted by the A/D conversion units 16 and 17 is expressed as a complex signal x(k, M) of Expression (5) using an in-phase signal component Ir(k, M) of the reception signal and a quadrature signal component Qr(k, M) of the reception signal.

[Expression 5]

$$x(k,M)=Ir(k,M)+jQr(k,M) \quad (5)$$

Figure 7:
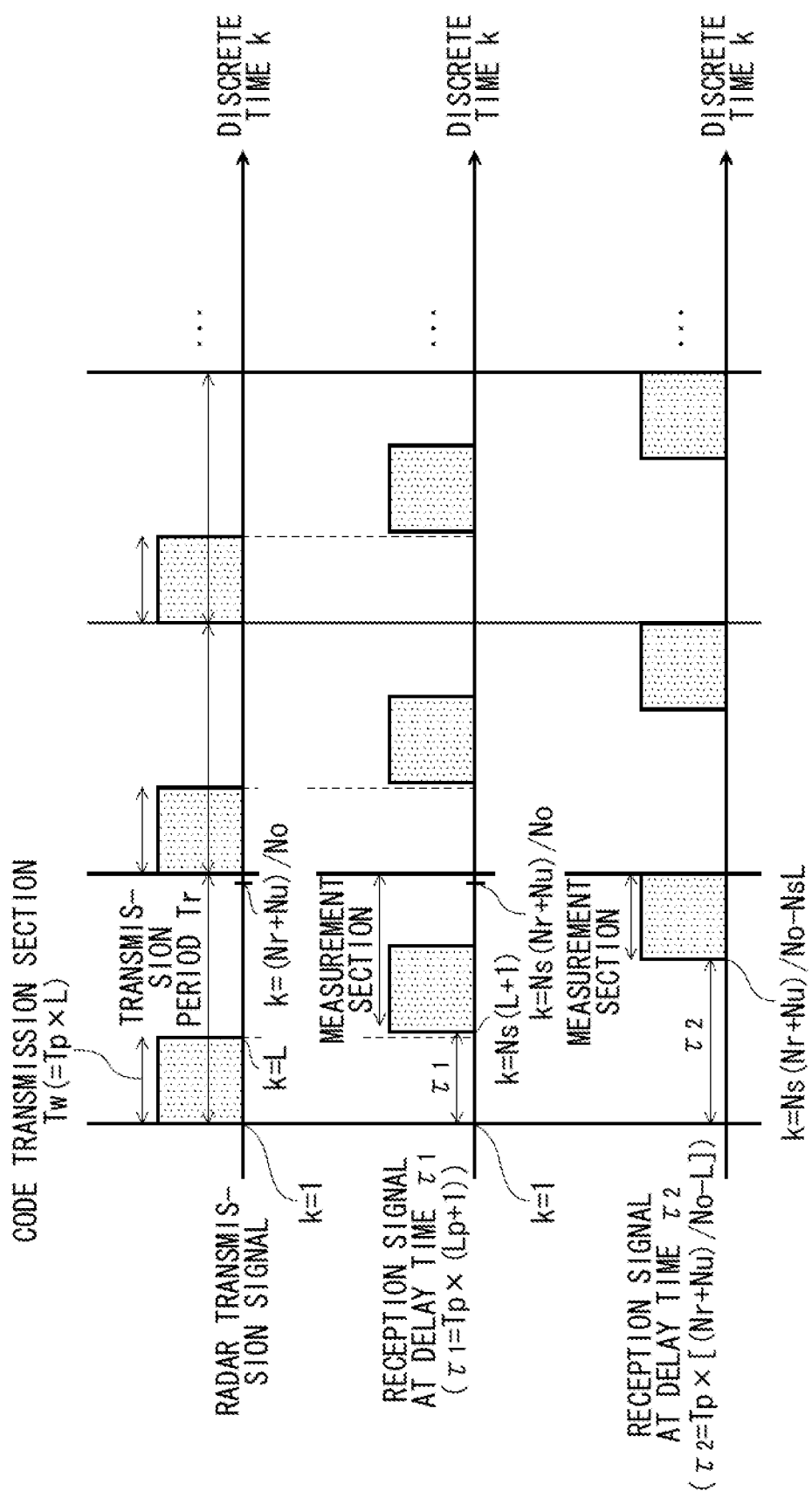
FIG. 7 is a diagram showing the relationship between the radar transmission beam and the reception signal at delay time $\tau_1$ and the reception signal at delay time $\tau_2$.

FIG. 7 is a diagram showing the relationship between the radar transmission beam and the reception signal at delay time $\tau_1$ and the reception signal at delay time $\tau_2$. The first stage of FIG. 7 indicates the transmission timing of the radar transmission signal. In the first stage of FIG. 7, a reference of the discrete time k is a timing at which each transmission period Tr starts (k=1), and the signal processing unit 12 operates periodically up to k=Ns(Nr+Nu)/No which is a sampling point before the transmission period Tr ends.

That is, the signal processing unit 12 operates periodically at discrete time k=1 to Ns(Nr+Nu)/No (refer to the second stage of FIG. 7). The second stage of FIG. 7 is a diagram showing the reception timing of the reception signal at delay time $\tau_1$. The third stage of FIG. 7 is a diagram showing the reception timing of the reception signal at delay time $\tau_2$. The discrete time k=Nr×(Ns/No) indicates a point in time immediately before the end of the transmission section Tw in each transmission period Tr. Hereinafter, the digital reception signal x(k, M) output from the A/D conversion units 16 and 17 is referred to as a discrete sample value x(k, M).

The discrete sample values Ir(k, M) and Qr(k, M) output from the A/D conversion units 16 and 17, that is, the discrete sample value x(k, M) as a reception signal is input to the correlation calculation unit 18. The correlation calculation unit 18 generates periodically the transmission code $C_n$ of the code length L, which is transmitted in each transmission period Tr shown in the first stage of FIG. 7, at each discrete time k on the basis of a receiving reference clock signal obtained by multiplying the reference signal a predetermined number of times. n is 1 to L, and L indicates the code length of the code sequence $C_n$.

The correlation calculation unit 18 calculates a sliding correlation value AC(k, M) between the input discrete sample value x(k, M) and the transmission code $C_n$. AC(k, M) indicates a sliding correlation value at discrete time k.

Specifically, the correlation calculation unit 18 calculates the sliding correlation value AC(k, M) according to Expression (6) for each transmission period Tr shown in the second stage of FIG. 7, that is, each discrete time k=1 to Ns(Nr+Nu)/No. The correlation calculation unit 18 outputs the sliding correlation value AC(k, M) at each discrete time k, which has been calculated according to Expression (6), to the adder unit 19. * (asterisk) indicates a complex conjugate operator.

[Expression 6]

$$AC(k, M) = \sum_{n=1}^{L} x(k + Ns(n-1), M)C_n^* \quad (6)$$

A measurement period range when a reception signal is received through the array antenna after the passage of the delay time $\tau_1$ from the start of transmission of the radar transmission beam is shown in the second stage of FIG. 7. A measurement period range when a reception signal is received through the array antenna after the passage of the delay time $\tau_2$ from the start of transmission of the radar transmission beam is shown in the third stage of FIG. 7. The delay time $\tau_1$ and the delay time $\tau_2$ are expressed as in Expressions (7) and (8), respectively.

[Expression 7]

$$\tau_1 = Tp \times (L+1) \quad (7)$$

[Expression 8]

$$\tau_2 = Tp \times \left\{ \frac{(Nr + Nu)}{No} - L \right\} \quad (8)$$

The correlation calculation unit 18 performs calculation at discrete time k=1 to Ns(Nr+Nu)/No in each embodiment including the present embodiment. In addition, the correlation calculation unit 18 may limit the measurement range, that is, the range of the discrete time k according to a presence range of the target, to be measured by the radar device 1. In this manner, the radar device 1 can further reduce the amount of calculation of the correlation calculation unit 18. That is, the radar device 1 can further reduce the power consumption in the radar receiving unit Rx by reducing the amount of calculation in the signal processing unit 12.

In addition, the radar device 1 may omit the measurement of the reflected wave signal in the transmission section Tw of the radar transmission beam when the correlation calculation unit 18 calculates the sliding correlation value AC(k, m) in the range of discrete time k=Ns(L+1) to Ns(Nr+Nu)/No−NsL.

In this case, even if the radar transmission beam is directly input to the radar receiving unit Rx, the radar device 1 can perform measurement without the influence by the input. In addition, when limiting the measurement range (range of the discrete time k), the adder unit 19, the inter-antenna correlation calculation unit 20, and the direction-of-arrival estimation unit 23 also operate in the same limited measurement range. Therefore, since the amount of processing of each section can be reduced, it is possible to reduce the power consumption in the radar receiving unit Rx.

The sliding correlation value AC(k, M) at each discrete time k output from the correlation calculation unit 18 is input to the adder unit 19. On the basis of the sliding correlation value AC(k, M) calculated at each discrete time k in the M-th transmission period Tr, the adder unit 19 adds the sliding correlation value AC(k, M) over a period (Np×Tr) of a predetermined number (Np) of transmission periods Tr.

Specifically, by addition of the sliding correlation value AC(k, M) at each discrete time k in the period (Np×Tr) of a predetermined number of (Np) transmission periods Tr, the adder unit 19 calculates an m-th coherent integration value CI(k, m) at each discrete time k according to Expression (9). Np indicates the number of additions in the adder unit 19. m indicates the ordinal number of the number of additions when the number of additions Np of the adder unit 19 of each antenna system processing unit is set as one unit. The adder unit 19 outputs the calculated coherent integration value CI(k, m) to the inter-antenna correlation calculation unit 20.

[Expression 9]

$$CI(k, m) = \sum_{g=1}^{Np} AC(k, Np(m-1) + g) \quad (9)$$

The adder unit 19 can improve the reception quality (SNR: Signal to Noise Ratio) of reflected wave signals by suppressing noise components included in the reflected wave signals in a range where the reflected wave signals from the target have high correlation due to "Np" additions of the sliding correlation value AC(k, M). In addition, since the adder unit 19 can improve the reception quality of the reflected wave signal, it is possible to improve the estimation accuracy of the direction of arrival of the reflected wave signal reflected by the target.

In addition, in order to obtain the ideal addition gain, the phase component of the sliding correlation value AC(k, M) needs to be in a certain range in the addition section of the number of additions Np of the sliding correlation value AC(k, M). That is, when the target is moving, the phase component changes with the movement. Therefore, it is preferable to set the number of additions Np on the basis of the assumed maximum movement speed of the target. As the assumed maximum movement speed of the target increases, the amount of variation in the Doppler frequency included in the reflected wave signal reflected by the target increases, and discrete time intervals having a high correlation value are shortened. For this reason, since the number of additions Np is reduced, the effect of gain improvement by addition of the adder unit 19 is reduced.

Coherent integration values $CI^1(k, m)$, $CI^2(k, m)$, $CI^3(k, m)$, and $CI^4(k, m)$ output from the adder units of the antenna system processing units 101, 102, 103, and 104 are input to the inter-antenna correlation calculation unit 20. In order to detect a phase difference between the receiving antennas of the reflected wave signal from the target, the inter-antenna correlation calculation unit 20 generates a correlation matrix H(k, m) at each discrete time k on the basis of the coherent integration values $CI^1(k, m)$, $CI^2(k, m)$, $CI^3(k, m)$, and $CI^4(k, m)$. The correlation matrix H(k, m) is generated according to Expression (10). In Expression (10), an index H given on the upper side is an operator indicating the complex conjugate transpose.

[Expression 10]

$$H(k, m) = \begin{bmatrix} CI^1(k, m) \\ CI^2(k, m) \\ \vdots \\ CI^4(k, m) \end{bmatrix} \begin{bmatrix} CI^1(k, m) \\ CI^2(k, m) \\ \vdots \\ CI^4(k, m) \end{bmatrix}^H \quad (10)$$

In addition, the inter-antenna correlation calculation unit 20 calculates a correlation matrix B(k) by averaging "Dp" correlation matrices H(k, m) according to Expression (11) over the period (Nf×Tr) of the "Nf (>Np)" transmission periods Tr.

[Expression 11]

$$B(k) = \sum_{m=1}^{Dp} H(k, m) \quad (11)$$

Dp indicates the number of correlation matrices averaged by the inter-antenna correlation calculation unit 20 over the period (Nf×Tr) of the "Nf (>Np)" transmission periods Tr, and satisfies Expression (12). It is preferable that Nf be the least common multiple of Np or an integral multiple of the least common multiple. The inter-antenna correlation calculation unit 20 outputs the correlation matrix B(k) after averaging to the direction-of-arrival estimation unit 23.

[Expression 12]

$$Dp = \frac{Nf}{Np} \quad (12)$$

In addition, using Expression (13) instead of Expression (10), the inter-antenna correlation calculation unit 20 may calculate a correlation vector with the phase of a signal, which is received by the receiving antenna of one of the plurality of antenna system processing units 101, 102, 103, and 104, as a reference phase. In Expression (13), an asterisk (*) given on the upper side indicates a complex conjugate operator. Since the amount of calculation of the inter-antenna correlation calculation unit 20 is reduced in this manner, the radar device 1 can easily calculate the phase difference between receiving antennas of the reflected wave signal from the target.

[Expression 13]

$$H(k, m) = \begin{bmatrix} CI^1(k, m) \\ CI^2(k, m) \\ \vdots \\ CI^4(k, m) \end{bmatrix} CI^1(k, m)^* \quad (13)$$

The direction vector storage unit 21 stores the complex response of the array antenna when the radar device 1 divides the azimuthal direction indicating the direction of arrival of the reflected wave signal reflected by the target, that is, a range, which is equivalent to the approximate transmission beam width BW of the radar device 1, into a predetermined number of (NU) regions. In the present embodiment, the complex response of the array antenna is a direction vector $D(\theta_u)$ including an azimuthal component $\theta_u$ when the range of the azimuthal direction indicating the direction of arrival is divided. u is an integer equal to or greater than 1 and equal to or less than NU. NU is a predetermined number determined according to the transmission beam width BW and the measurement area of the radar device 1.

The complex response of the array antenna is measured in advance, for example, in an anechoic room, and includes not only the phase difference information calculated geometrically at antenna element distances between array antennas but also deviation information including each error of the amplitude and phase and coupling between antenna elements between array antennas. This is the same as in each of the embodiments to be described later.

An instruction from the transmission beam control unit 8, that is, the main beam direction $\theta(q)$ of the transmission beam formed by the transmission beam forming unit 9 is input to the estimation range selection unit 22. The estimation range selection unit 22 selects an estimation range RangeDOA($\theta$(q)) of the direction of arrival of the reflected wave according to Expression (14) on the basis of the main beam direction $\theta(q)$ of the transmission beam and the range equivalent to the approximate transmission beam width BW of the radar transmission beam. Here, q is a natural number, and is an ordinal number indicating the number of scans in the main beam direction.

[Expression 14]

$$\theta(q) - \frac{BW}{2} \leq RangeDOA(\theta(q)) \leq \theta(q) + \frac{BW}{2} \quad (14)$$

The estimation range selection unit 22 changes the estimation range RangeDOA($\theta$(q)) of the direction of arrival of the reflected wave signal every "Nf" transmission periods Tr (Nf×Tr) (refer to FIG. 8). The estimation range selection unit 22 outputs the estimation range RangeDOA($\theta$(q)) to the direction-of-arrival estimation unit 23.

Specifically during the first "Nf" transmission periods (Nf×Tr), the estimation range selection unit 22 selects a range of "$\theta(1)$−BW/2" to "$\theta(1)$+BW/2" as the estimation range RangeDOA($\theta$(1)) of the direction of arrival of the reflected wave signal in synchronization with an instruction from the transmission beam control unit 8.

In addition, during the second "Nf" transmission periods (Nf×Tr), the estimation range selection unit 22 selects a range of "$\theta(2)$−BW/2" to "$\theta(2)$+BW/2" as the estimation range RangeDOA($\theta$(2)) of the direction of arrival of the reflected wave signal in synchronization with an instruction from the transmission beam control unit 8.

In addition, during the third "Nf" transmission periods (Nf×Tr), the estimation range selection unit 22 selects a range of "$\theta(3)$−BW/2" to "$\theta(3)$+BW/2" as the estimation range RangeDOA($\theta$(3)) of the direction of arrival of the reflected wave signal in synchronization with an instruction from the transmission beam control unit 8.

In addition, the estimation range selection unit 22 may read a direction vector $D(\theta_{select})$ corresponding to the estimation range RangeDOA($\theta$(q)) from the direction vector storage unit 21 and output it to the direction-of-arrival estimation unit 23.

The correlation matrix B(k) output from the inter-antenna correlation calculation unit 20 and the estimation range RangeDOA($\theta$(q)) output from the estimation range selection unit 22 are input to the direction-of-arrival estimation unit 23. The direction-of-arrival estimation unit 23 reads the direction vector $D(\theta_{select})$ corresponding to the estimation range RangeDOA($\theta$(q)) from the direction vector storage unit 21.

The direction-of-arrival estimation unit 23 calculates an evaluation function value of the direction of arrival of the reflected wave signal reflected by the target at each discrete time k on the basis of the correlation matrix B(k) and the direction vector $D(\theta_{select})$ corresponding to the estimation range RangeDOA($\theta$(q)).

Figure 9:
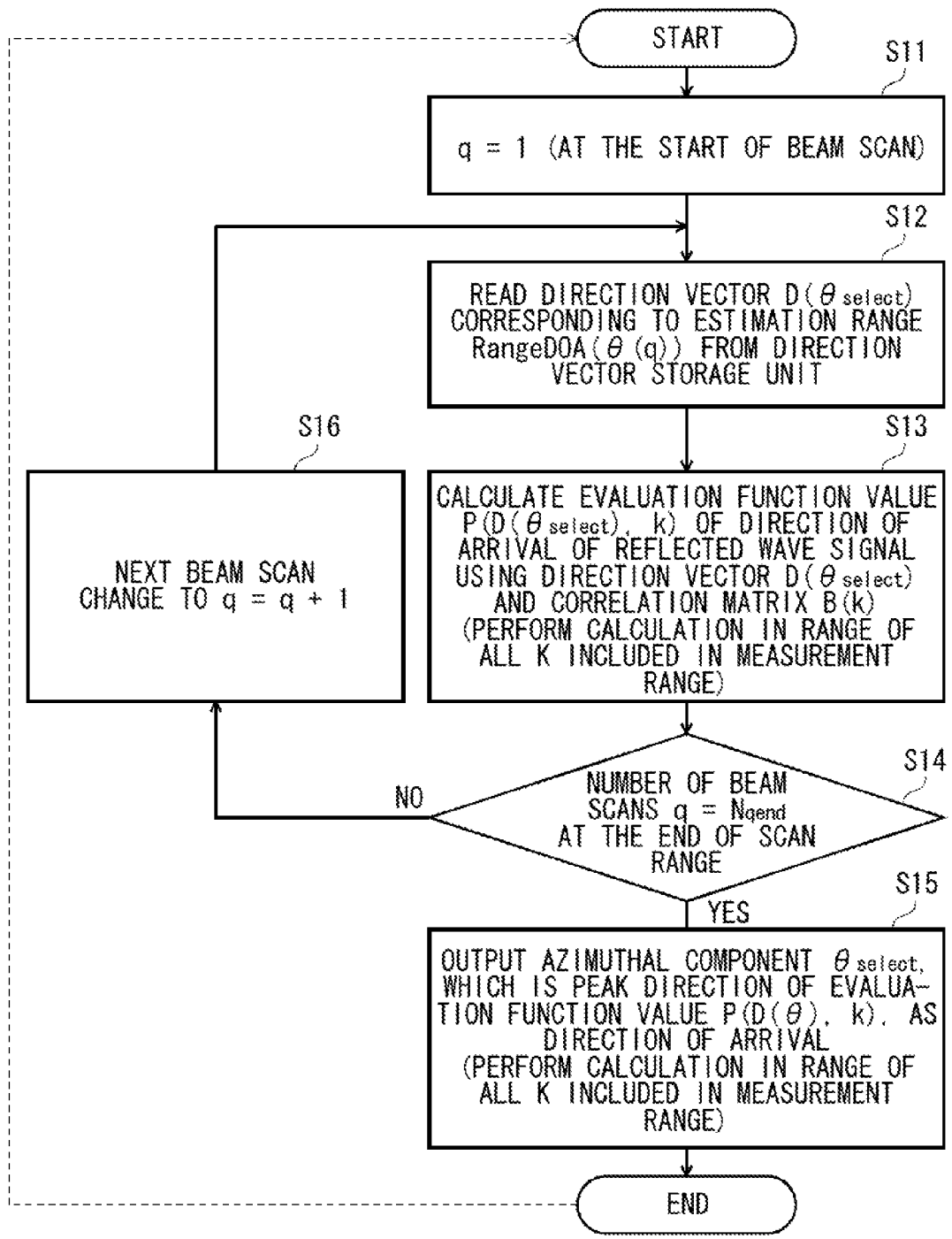
FIG. 9 is a flow chart illustrating the operation of a direction-of-arrival estimation unit of the first embodiment.

The operation of the direction-of-arrival estimation unit 23 will be described with reference to FIG. 9. FIG. 9 is a flow chart illustrating the operation of the direction-of-arrival estimation unit 23 of the first embodiment.

In FIG. 9, the direction-of-arrival estimation unit 23 sets q=1, which is the start time of a scan of the radar transmission beam, as the start time of the direction estimation processing in the radar device 1 (S11). The direction-of-arrival estimation unit 23 reads the direction vector $D(\theta_{select})$ corresponding to the estimation range RangeDOA($\theta$(q)) from the direction vector storage unit 21.

The direction-of-arrival estimation unit 23 calculates an evaluation function value $P[D(\theta_{select}), k]$ of the direction of arrival of the reflected wave signal according to Expression (15) using the direction vector $D(\theta_{select})$ and the correlation matrix B(k) (S13).

[Expression 15]

$$P[D(\theta_{select}), k] = D(\theta_{select})^H B(k) D(\theta_{select}) \quad (15)$$

In addition, various evaluation function values according to the direction-of-arrival estimation algorithm are known as the evaluation function value $P[D(\theta_{select}), k]$. In each embodiment including the present embodiment, for example, an evaluation function value in a beam forming method using an array antenna, which is disclosed in the following NPL 1 for reference, is used. In Expression (15), an index H given on the upper side is a Hermitian transpose operator. In addition, the Capon method or the MUSIC method may be used. In this case, the amount of calculation processing is increased, but an estimated value with higher angular resolution is obtained.

(NPL 1 for reference) James A. Cadzow, "Direction of Arrival Estimation Using Signal Subspace Modeling", Aerospace and Electronic Systems, IEEE Transactions on Vol. 28, Issue: 1, pp. 64-79 (1992)

The direction-of-arrival estimation unit 23 performs a different operation according to whether or not scans of the number of scans q of the radar transmission beam, that is, scans of a predetermined scan range, have been completed (S14). That is, when the number of beam scans q is smaller than the predetermined number of beam scans q=$N_{qend}$ (S14, NO), a change to q=q+1 is made to continue the scan of the radar transmission beam (S16), and steps S12 and S13 are repeated.

On the other hand, when the number of beam scans q is equal to the predetermined number of scans $N_{qend}$ of the radar transmission beam, it is determined that the beam scan of the detection range of the radar device 1 has been completed (S14, YES), and the direction-of-arrival estimation unit 23 sets an azimuthal component DOA(k), at which the evaluation function value $P[D(\theta), k]$ of the direction of arrival at each discrete time k calculated in step S13 becomes a maximum value, as a direction-of-arrival estimate (S15).

When the direction-of-arrival estimation unit 23 continues repeating the detection of a target in the scan range of the radar transmission beam after the end of the above operation, the scan of a transmission beam is started sequentially from the first main beam direction ($\theta(1)$) in order of $\theta(1)$, $\theta(2), \ldots, \theta(N_{qend}-1)$, and $\theta(N_{qend})$ (refer to the dotted line in FIG. 9). Here, $\theta(N_{qend})$ indicates a main beam direction of the radar transmission beam transmitted at the end in the scan range of the radar transmission beam of the radar device 1.

In addition, when the direction-of-arrival estimation unit 23 continues repeating the detection of a target in the scan range of the radar transmission beam, the order of the scanning direction of the radar transmission beam may be changed. For example, a transmission beam scan may be performed in order of $\theta(N_{qend}), \theta(N_{qend}-1), \ldots, \theta(2)$, and $\theta(1)$. That is, the scan of the radar transmission beam may be performed in reverse order of the order of the previous scanning direction of the radar transmission beam.

FIG. 10 is a diagram showing the estimation simulation result of the direction of arrival when the number of receiving array antenna elements is 4 and four targets are present at positions at the same distance with different angles. The true values of the directions of arrival of the reflected wave signals from the four targets are −10°, 0°, 10°, and 20°.

Figure 10A:
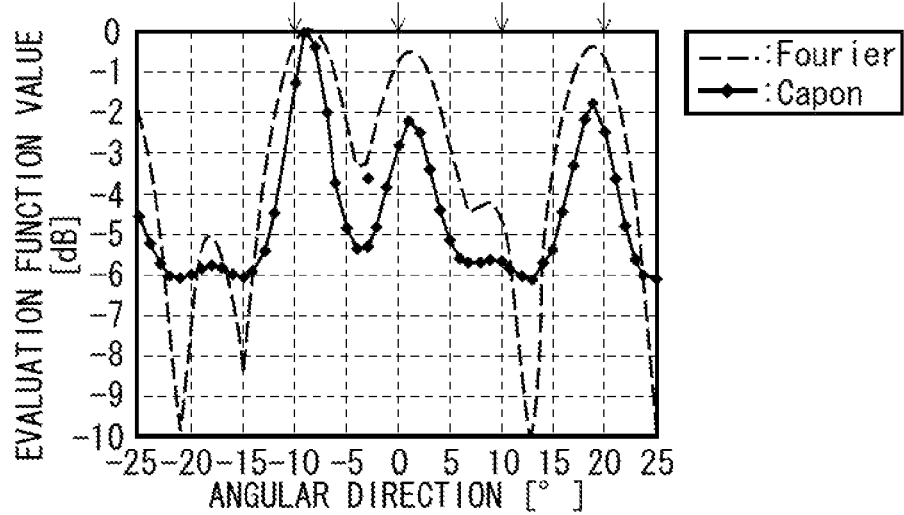
FIGS. 10A, 10B, 10C are diagrams showing the estimation simulation results of the direction of arrival when the number of receiving array antenna elements is 4 and four targets are present at positions at the same distance with different angles, where
Figure 10B:
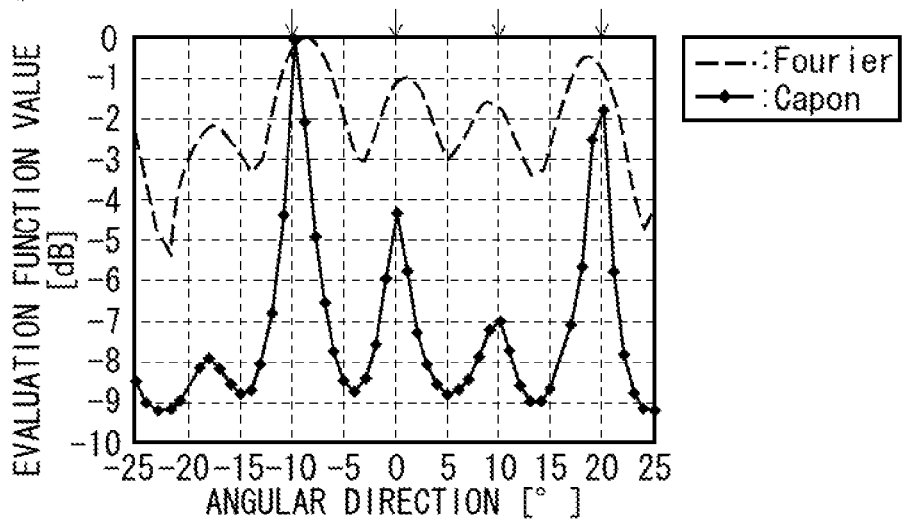
Figure 10C:
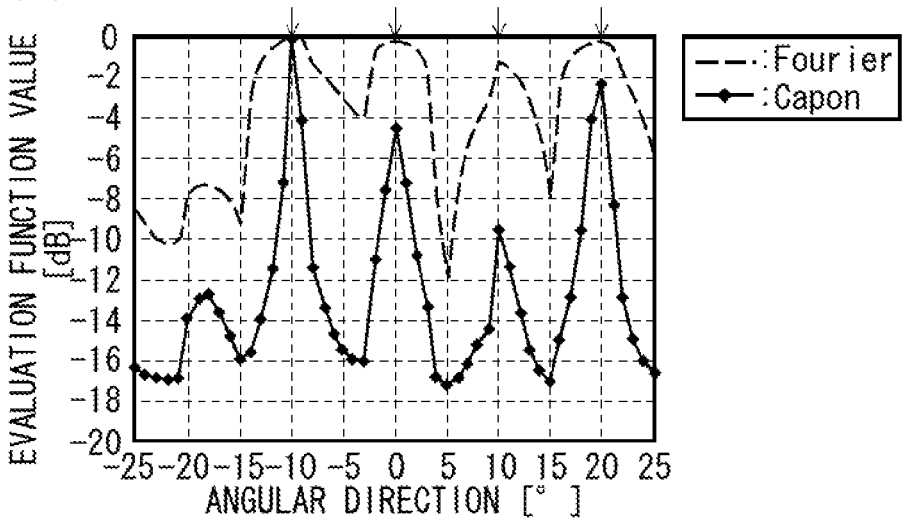

FIG. 10A is a diagram showing the estimation simulation result when a scan of the transmission beam is not performed (and the directivity of the transmission antenna is uniform in the range of ±30° and matches the gain of the main beam direction when scanning the radar transmission beam). FIG. 10B is a diagram showing the estimation simulation result when a scan of the radar transmission beam is performed but the estimation range is not selected according to the main beam direction of the radar transmission beam. FIG. 10C is a diagram showing the estimation simulation result when there is a scan of the radar transmission beam and the estimation range is selected according to the main beam direction of the radar transmission beam.

In FIGS. 10A to 10C, the horizontal axis indicates an angular direction [°], and the vertical axis indicates an evaluation function value [dB] for the direction of arrival on the horizontal axis. In the estimation simulation result shown in FIG. 10A, similar to the estimation simulation result shown in FIG. 17B, since the radar transmitting unit Tx does not perform a scan of the radar transmission beam, reflected wave signals from four targets are simultaneously received. Accordingly, since it is necessary to separate the reflected wave signals from targets, the number of which is approximately the same as the number of antenna elements, the estimation accuracy of the direction of arrival is degraded.

Then, in FIG. 10B, the evaluation function value of the direction of arrival is calculated on the basis of all reflected wave signals, in the scan range of the radar transmission beam, for each radar transmission beam. Accordingly, in the addition value of the evaluation function value of the direction of arrival, the reception SNR of the reflected wave signal is low in a range not included in the main beam direction. As a result, since a noise component is emphasized and an error occurs, the estimation accuracy of the direction of arrival is degraded.

On the other hand, the radar device 1 of the present embodiment changes the main beam direction of the radar transmission beam sequentially in the scan range of the radar transmission beam of the radar device 1, and estimates the direction of arrival of the reflected wave signal reflected by the target in a range of the approximate transmission beam width of the radar device 1 and the main beam direction of the radar transmission beam.

That is, the radar device 1 selects an estimation range corresponding to the main beam direction θ of the radar transmission beam, and calculates an estimate of the direction of arrival of the reflected wave signal in the selected estimation range using a range of the angle at which the reception SNR of the reflected wave signal is the best. In this manner, in FIG. 10C, since the radar device 1 can improve the estimation accuracy of the direction of arrival of the reflected wave signal from the target, it is possible to reduce the estimation error of the direction of arrival.

In addition, the radar device 1 selects an estimation range corresponding to the main beam direction θ of the radar transmission beam, and estimates the direction of arrival of the reflected wave signal in a range of the angle at which the reception SNR of the reflected wave signal is the best. Accordingly, since it is possible to reduce the processing time per one radar transmission beam, it is possible to simplify the circuit configuration.

In addition, even if targets of the number of antenna elements or more are present within the distance resolution ΔR, the radar device 1 can spatially suppress the reflected wave signals from targets present in directions other than the main beam direction of the radar transmission beam and the range of the transmission beam width.

In this case, a probability is increased that the radar device 1 can receive the reflected wave signals from targets, which are present in the range of the transmission beam width and the main beam direction of the radar transmission beam within the distance resolution ΔR and the number of which is less than the number of receiving array antenna elements. Accordingly, it is possible to accurately decompose and detect reflected wave signals from a plurality of targets, which are present within the distance resolution ΔR, in the range of the beam width BW.

In addition, since the angle of arrival is estimated by signal processing in the radar receiving unit, the radar device 1 can use a radar transmission beam having a relatively large transmission beam width of, for example, about 3° to 10°. Therefore, it is possible to shorten the scan time of the radar transmission beam in the beam scan range of the radar device 1. For example, when the radar device 1 uses a radar transmission beam having a transmission beam width of 10° when the beam scan range is 100°, the number of scans of the radar transmission beam can be reduced to ⅒ of that in a scan of a transmission beam having a narrow angle (for example, 1°) in the conventional radar device described above.

In addition, since the radar device 1 performs high-resolution direction estimation of a range within the transmission beam width of the radar transmission beam, the high-resolution direction estimation is possible even if a radar transmission beam having a transmission beam width of about 5° to 10° is used. Accordingly, compared with a configuration using a scan of a radar transmission beam having a narrow beam width of several degrees, it is possible to reduce the antenna aperture length. As a result, since it is possible to reduce the antenna size, it is possible to reduce the size of the radar device 1.

Modification Example of the First Embodiment

Figure 11:
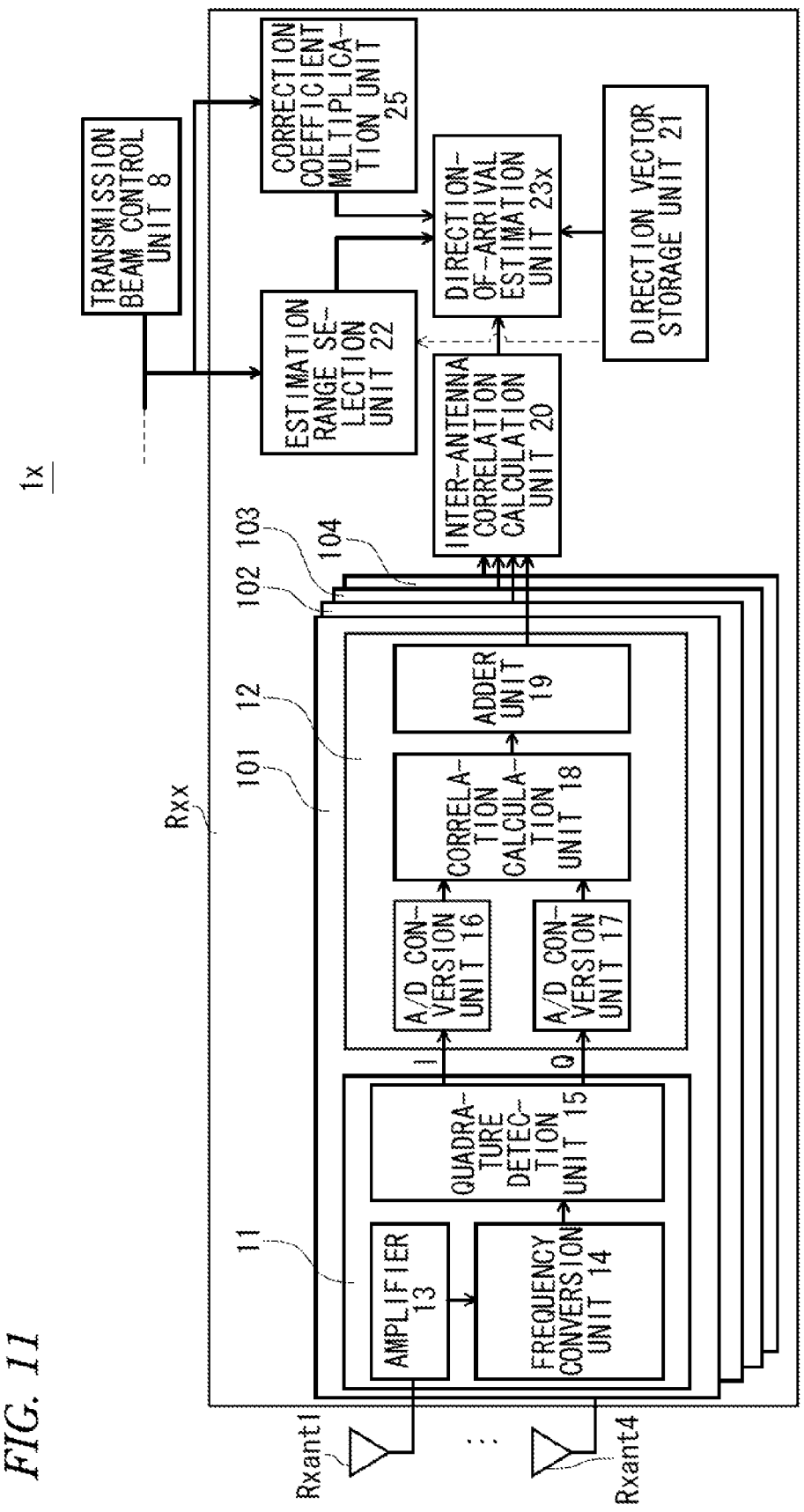
FIG. 11 is a block diagram showing the detailed internal configuration of a radar receiving unit of a radar device of a modification example of the first embodiment.

FIG. 11 is a block diagram showing the detailed internal configuration of a radar receiving unit Rxx of a radar device 1x in a modification example of the first embodiment. In addition, since the configuration of a radar transmitting unit of the radar device 1x is the same as that of the radar transmitting unit Tx shown in FIG. 3, the configuration of the radar transmitting unit of the radar device 1x is omitted in FIG. 11. The radar receiving unit Rxx further has a correction coefficient multiplication unit 25 in the radar receiving unit Rx shown in FIG. 3. In the explanation of FIG. 11, the same configuration as in the radar receiving unit Rx shown in FIG. 3 is denoted by the same reference numeral as the reference numeral of each section of the radar receiving unit Rx, and explanation thereof will be omitted.

In the first embodiment, a gain difference may occur between the signal levels of the radar transmission beams according to the main beam direction θ of the radar transmission beam due to the deviation between the transmission systems of the transmission antennas or the transmission RF units.

In this modification example, when a gain difference between the signal levels of the radar transmission beams due to the deviation caused between the transmission systems or between the receiving systems cannot be neglected, the radar device 1x corrects the gain difference between the signal levels of the radar transmission beams.

The correction coefficient multiplication unit 25 holds a table of inter-beam gain correction coefficients for correcting the gain difference, which is caused by deviation, for each gain of the signal level of the transmission beam corresponding to the main beam direction θ(q) of the radar transmission beam. The inter-beam gain correction coefficient in the table is calculated in advance by simulation or measurement.

An instruction from the transmission beam control unit 8 is input to the correction coefficient multiplication unit 25, and the correction coefficient multiplication unit 25 reads an inter-beam gain correction coefficient ΔG(θ(q)) corresponding to the main beam direction θ(q) from the table on the basis of the main beam direction θ(q) of the radar transmission beam and outputs the inter-beam gain correction coefficient ΔG(θ(q)) to a direction-of-arrival estimation unit 23x.

The direction-of-arrival estimation unit 23x calculates an evaluation function value P[D(θ$_{select}$), k] of the direction of arrival of the reflected wave signal according to Expression (16) using the direction vector D(θ$_{select}$), the correlation matrix B(k), and the inter-beam gain correction coefficient ΔG(θ(q)) as an offset value. Since subsequent explanation is the same as that in the first embodiment, the explanation will be omitted. β is a predetermined coefficient.

[Expression 16]

$$P[D(\theta_{select}),k] = D(\theta_{select})^H B(k) D(\theta_{select}) + \beta \Delta G(\theta(q)) \quad (16)$$

In this manner, since the radar device 1x can correct the gain difference between the signal levels of the radar transmission beams due to the deviation caused between the transmission systems or between the receiving systems according to the main beam direction θ(q) of the radar transmission beam, it is possible to appropriately calculate the evaluation function value of the direction of arrival of the reflected wave signal. Therefore, since the radar device 1x can further improve the estimation accuracy of the direction of arrival of the reflected wave signal from the target, it is possible to further reduce the estimation error of the direction of arrival.

Second Embodiment

Figure 12:
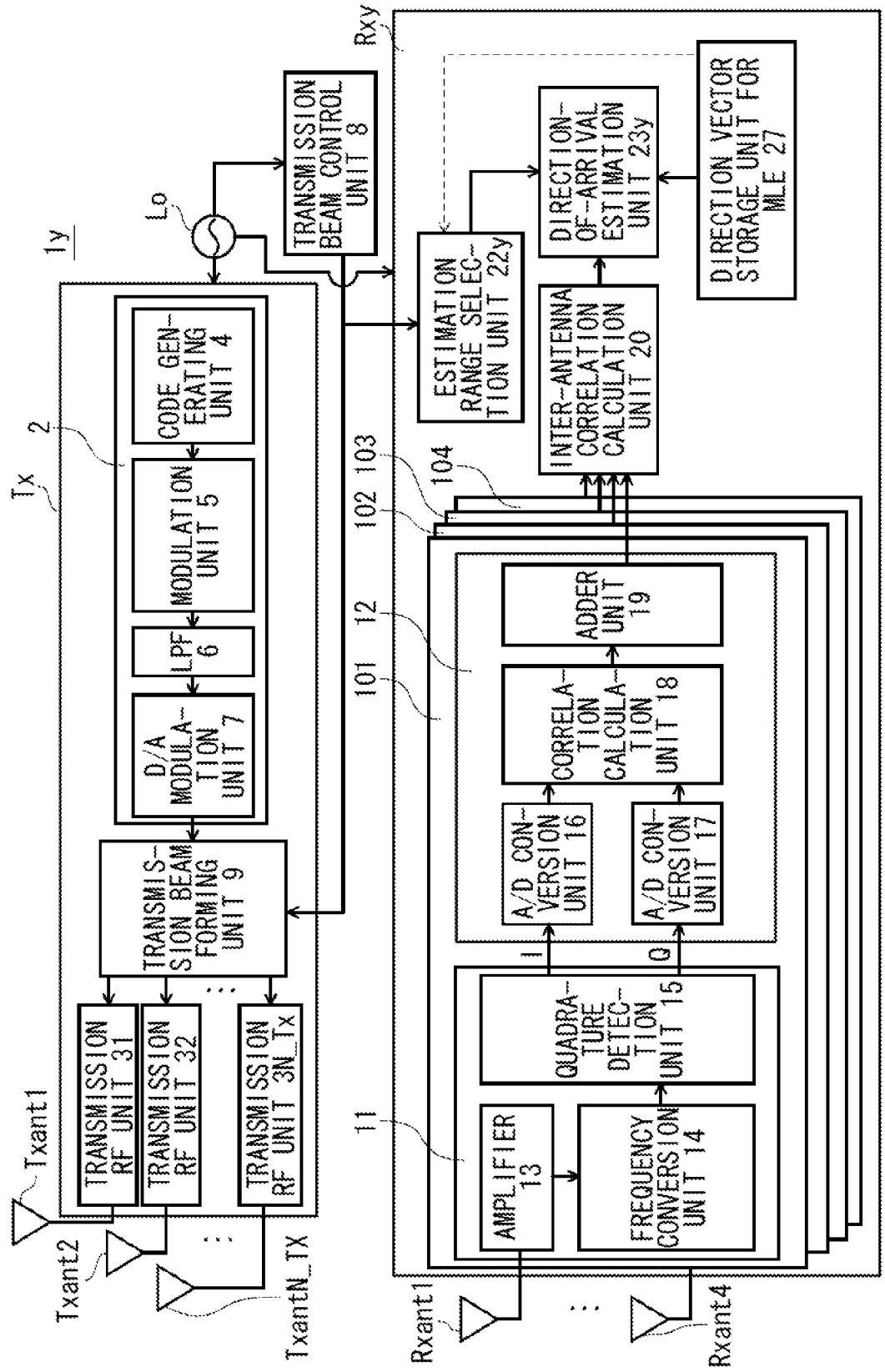
FIG. 12 is a block diagram showing the detailed internal configuration of a radar device of a second embodiment.

FIG. 12 is a block diagram showing the detailed internal configuration of a radar device 1y of the second embodiment. In the present embodiment, it is assumed that reflected wave signals of N waves are included in a range of the appropriate transmission beam width BW (refer to Expression (14)) of the same radar transmission beam as in the first embodiment, and maximum likelihood estimation (MLE) is used for the estimation of the direction of arrival of the reflected wave signal from the target. N is the number of targets present in a direction within the transmission beam width of radar transmission beams transmitted at a time. Hereinafter, for simplicity of explanation, a case of N=2 will be described. However, the present embodiment is not limited to N=2.

The radar device 1y includes a reference signal oscillator Lo, a transmission beam control unit 8, a radar transmitting unit Tx, and a radar receiving unit Rxy. The radar receiving unit Rxy has, for example, four antenna system processing units 101, 102, 103, and 104, an inter-antenna correlation calculation unit 20, a direction vector storage unit for MLE 27, an estimation range selection unit 22y, and a direction-of-arrival estimation unit 23y. Although the radar receiving unit Rxy shown in FIG. 12 has four antenna system processing units, the number of antenna system processing units may be 2 or more without being limited to 4.

Hereinafter, explanation regarding the configuration and the operation of the radar device 1y of the present embodiment, which are the same as those of the radar device 1 of the first embodiment, will be omitted, and differences from the radar device 1 will be described.

The direction vector storage unit for MLE 27 stores the complex response of the array antenna when the radar device 1y divides the azimuthal angle indicating the direction of arrival of the reflected wave signal reflected by the target, that is, a range of the transmission beam width BW of the radar device 1y into a predetermined number of (NU) regions. In the present embodiment, the complex response of the array antenna is a direction vector D(θ$_u$) including an azimuthal component θ$_u$ when the range of the azimuthal angle indicating the direction of arrival is divided. u is an integer equal to or greater than 1 and equal to or less than NU. NU is a predetermined number determined according to the transmission beam width BW and the measurement area of the radar device 1.

The direction vector storage unit for MLE 27 further stores a direction matrix Z(φ$_0$, φ$_1$) expressed as in Expression (17). In Expression (17), φ$_0$ and φ$_1$ are values within the range selected by the estimation range selection unit 22y (refer to Expression (18)).

[Expression 17]

$$Z(\psi_0, \psi_1) = (S^H(\psi_0, \psi_1) S(\psi_0, \psi_1))^{-1} S^H(\psi_0, \psi_1) \quad (17)$$

$$S(\psi_0, \psi_1) = [D(\psi_0), D(\psi_1)]$$

-continued

[Expression 18]

$$\theta(q) - \frac{BW}{2} \le \psi_0 \le \theta(q) + \frac{BW}{2} \quad (18)$$
$$\theta(q) - \frac{BW}{2} \le \psi_1 \le \theta(q) + \frac{BW}{2}$$
$$\psi_0 \le \psi_1$$

An instruction from the transmission beam control unit 8, that is, the main beam direction θ(q) of the transmission beam formed by the transmission beam forming unit 9, is input to the estimation range selection unit 22y. The estimation range selection unit 22y selects an estimation range RangeDOA(θ(q)) of the direction of arrival of the reflected wave according to Expression (14) on the basis of the main beam direction θ(q) of the transmission beam and the range equivalent to the approximate transmission beam width BW of the radar transmission beam.

The estimation range selection unit 22y changes the estimation range RangeDOA(θ(q)) of the direction of arrival of the reflected wave signal every "Nf" transmission periods Tr (NfxTr) (refer to FIG. 8). The estimation range selection unit 22 outputs the estimation range RangeDOA(θ(q)) to the direction-of-arrival estimation unit 23.

Figure 13:
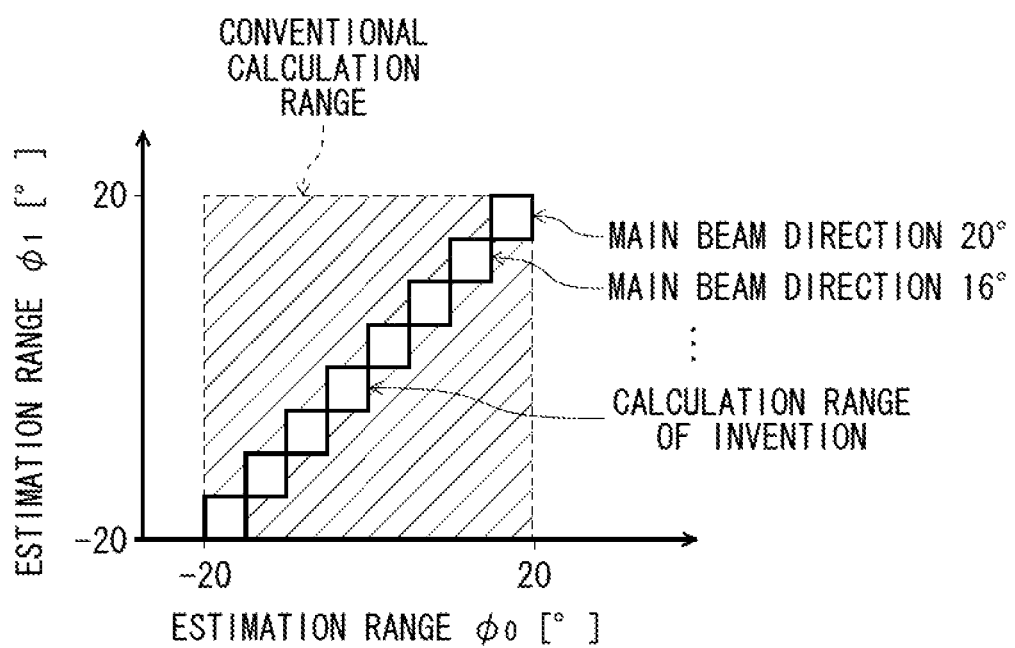
FIG. 13 is a diagram showing the estimation range of the direction of arrival for the scanning direction of one transmission beam.

FIG. 13 is a diagram showing the estimation range of the direction of arrival for the scanning direction of one transmission beam. In FIG. 13, the horizontal and vertical axes indicate estimation ranges $\phi_0$ and $\phi_1$ [°] of the azimuthal direction corresponding to the main beam direction [°] of the radar transmission beam, respectively.

In FIG. 13, a small square indicates a main beam direction of the formed radar transmission beam, and −20° to +20° are shown. In addition, in FIG. 13, a radar transmission beam is formed a total of 8 times in a range of the beam width (for example, from −20° to +20°) of the radar device 1y, and the number of scans of the radar transmission beam is 8. In addition, the area of the small square indicates a calculation range for performing the estimation of the angle of arrival that the radar receiving unit Rxy performs for the target estimation range according to the formed radar transmission beam.

Since the value of the area of the range from −20° to +20° on each of the horizontal and vertical axes in FIG. 13 indicates the amount of calculation for estimation that the conventional radar device performs for the target estimation range, the radar device 1y of the present embodiment can further reduce the amount of calculation for estimation of a target compared with the conventional radar device.

In addition, the estimation range selection unit 22y may read the direction matrix $Z(\phi_0, \phi_1)$ and the direction vector $D(\theta_{select})$ corresponding to the estimation range RangeDOA(θ(q)) from the direction vector storage unit for MLE 27 and output them to the direction-of-arrival estimation unit 23.

The correlation matrix B(k) output from the inter-antenna correlation calculation unit 20 and the estimation range RangeDOA(θ(q)) or the estimation range RangeDOA(θ(q)) and the direction matrix $Z(\phi_0, \phi_1)$ output from the estimation range selection unit 22y are input to the direction-of-arrival estimation unit 23y. The direction-of-arrival estimation unit 23y reads direction vectors $D(\phi_0)$ and $D(\phi_1)$ corresponding to the estimation range RangeDOA(θ(q)) from the direction vector storage unit for MLE 27.

The direction-of-arrival estimation unit 23y estimates a direction of arrival of the reflected wave signal reflected by the target at each discrete time k on the basis of the correlation matrix B(k) and the direction matrix $Z(\phi_0, \phi_1)$ and the direction vectors $D(\phi_0)$ and $D(\phi_1)$ corresponding to the estimation range RangeDOA(θ(q)).

Figure 14:
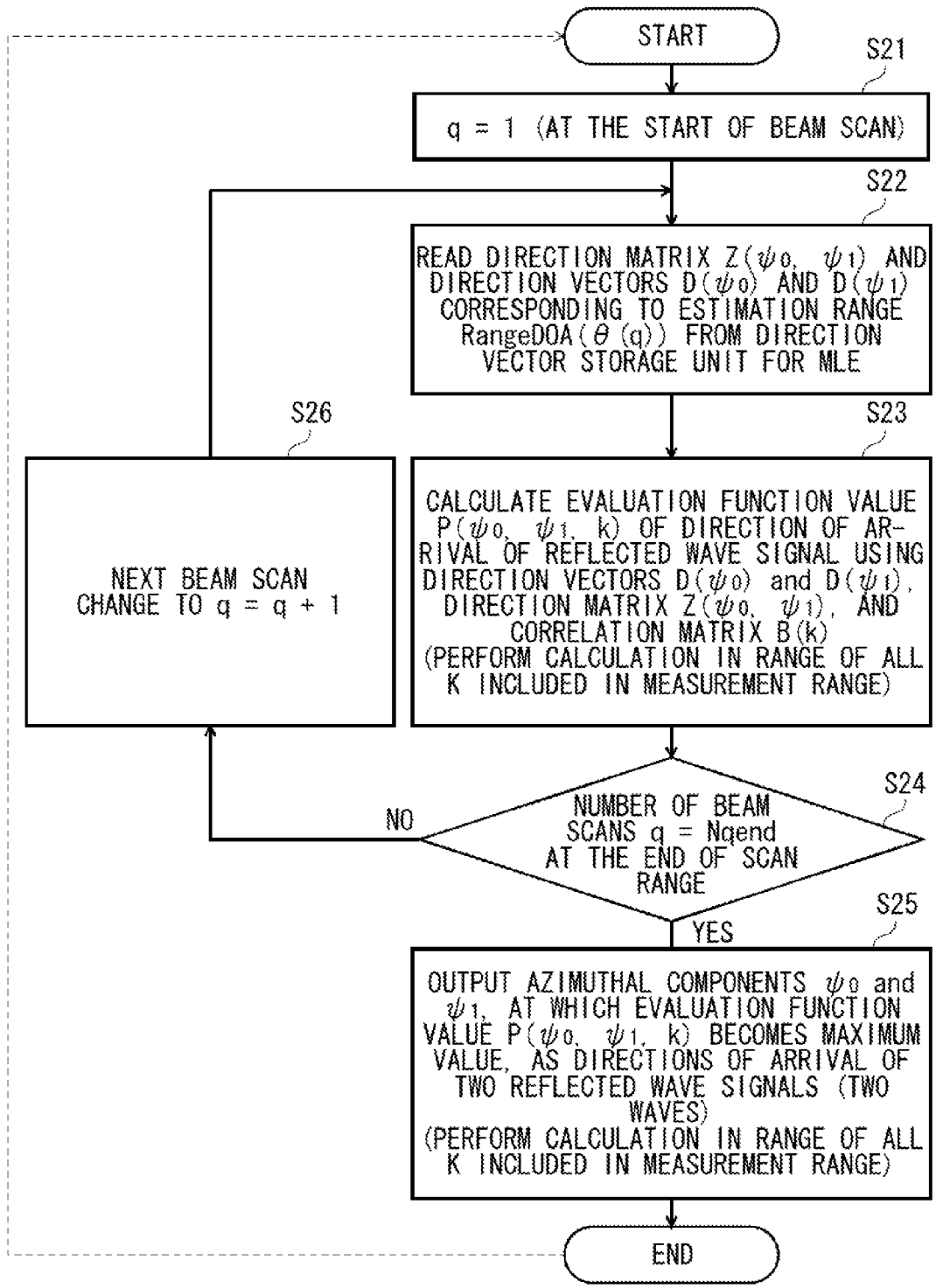
FIG. 14 is a flow chart illustrating the operation of a direction-of-arrival estimation unit of the second embodiment.

The operation of the direction-of-arrival estimation unit 23y will be described with reference to FIG. 14. FIG. 14 is a flow chart illustrating the operation of the direction-of-arrival estimation unit 23y of the second embodiment.

In FIG. 14, the direction-of-arrival estimation unit 23 sets q=1, which is the start time of a beam scan, as the start time of the direction estimation processing in the radar device 1y (S21). The direction-of-arrival estimation unit 23y reads the direction matrix $Z(\phi_0, \phi_1)$ and the direction vectors $D(\phi_0)$ and $D(\phi_1)$ corresponding to the estimation range RangeDOA(θ(q)) from the direction vector storage unit for MLE 27 (S22).

The direction-of-arrival estimation unit 23y calculates an evaluation function value $P[\phi_0, \phi_1, k]$ of the direction of arrival of the reflected wave signal according to Expression (19) using the direction vectors $D(\phi_0)$ and $D(\phi_1)$, the direction matrix $Z(\phi_0, \phi_1)$, and the correlation matrix B(k) (S23). In addition, in Expression (20), $B^{nc}(k)$ indicates an nc-th column vector of the correlation matrix B(k) output from the inter-antenna correlation calculation unit 20. In addition, a value obtained by adding the evaluation function values using a plurality of column vectors of the correlation matrix B(k) may be set as the evaluation function value.

[Expression 19]

$$P[\psi_0, \psi_1, k] = 1/\|B^{nc}(k) - \alpha_0 D(\psi_0) - \alpha_1 D(\psi_1)\|^2 \quad (19)$$
$$\begin{bmatrix} \alpha_0 \\ \alpha_1 \end{bmatrix} = (S^H(\psi_0, \psi_1)S(\psi_0, \psi_1))^{-1} S^H(\psi_0, \psi_1) B^{nc}(k)$$
$$S(\psi_0, \psi_1) = [D(\psi_0), D(\psi_1)]$$

The direction-of-arrival estimation unit 23y performs a different operation according to whether or not scans of the number of scans q of the radar transmission beam, that is, scans of a predetermined scan range, have been completed (S24). That is, when the number of beam scans q is smaller than the predetermined number of scans q=$N_{qend}$ of the radar transmission beam (S24, NO), a change to q=q+1 is made to continue the scan of the radar transmission beam (S26), and steps S22 and S23 are repeated.

On the other hand, when the number of beam scans q is equal to the predetermined number of scans $N_{qend}$ of the radar transmission beam, it is determined that the beam scan of the detection range of the radar device 1y has been completed (S24, YES). The direction-of-arrival estimation unit 23y sets an azimuthal component DOA(k), at which the evaluation function value $P[\phi_0, \phi_1, k]$ of the direction of arrival at each discrete time k in the detection range of the radar device 1y becomes a maximum value, as a direction-of-arrival estimate using the evaluation function value $P[\phi_0, \phi_1, k]$ of the direction of arrival at each discrete time k obtained for each main beam direction θ(q) calculated in step S23 (S25). Here, θmin<$\phi_0$ and $\phi_1$<θmaximum When the direction-of-arrival estimation unit 23y continues repeating the detection of a target in the scan range of the radar transmission beam after the end of the above operation, the scan of a transmission beam is started sequentially from the first main beam direction (θ(1)) in order of θ(1), θ(2), . . . , θ($N_{qend}$−1), and θ($N_{qend}$) (refer to the dotted line in FIG. 14). Here, θ($N_{qend}$) indicates a main beam direction of the radar transmission beam transmitted at the end in the scan range of the radar transmission beam of the radar device 1.

In addition, when the direction-of-arrival estimation unit 23y continues repeating the detection of a target in the scan range of the radar transmission beam, the order of the scanning direction of the radar transmission beam may be changed. For example, a transmission beam scan may be performed in order of $\theta(N_{qend})$, $\theta(N_{qend}-1)$, ..., $\theta(2)$, and $\theta(1)$. That is, the scan of the radar transmission beam may be performed in reverse order of the order of the previous scanning direction of the radar transmission beam.

As described above, in the radar device 1y of the present embodiment, it is assumed that reflected wave signals of N waves are included in a range of the transmission beam width (refer to Expression (14)) of the same radar transmission beam as in the first embodiment, and maximum likelihood estimation (MLE) is used for the estimation of the direction of arrival of the reflected wave signal from the target.

Figure 15A:
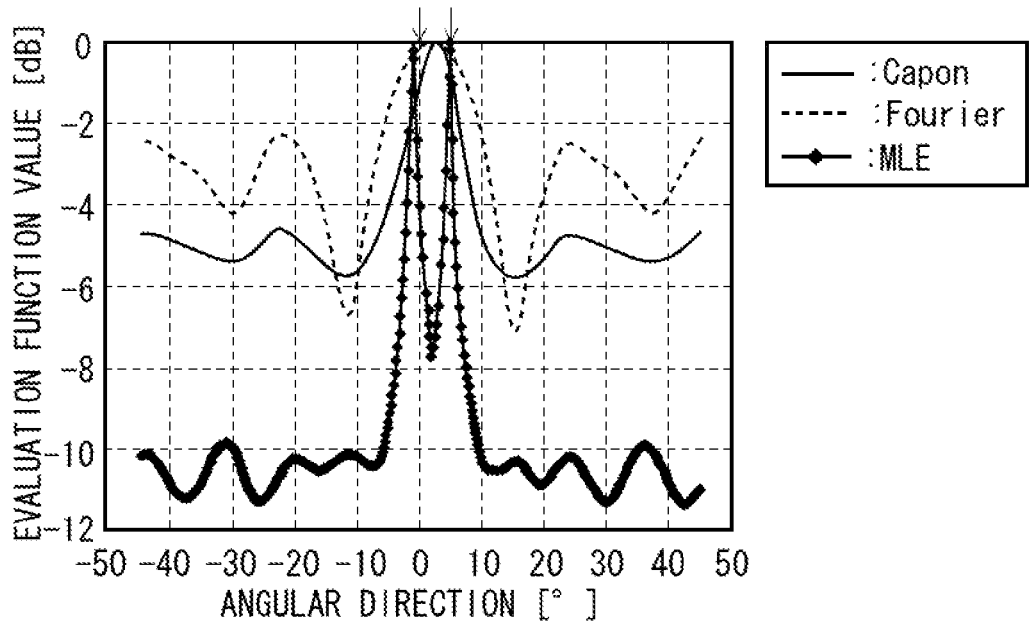
FIGS. 15A and 15B are diagrams showing the estimation simulation result of the direction of arrival when the number of receiving array antenna elements is 4 and two targets are present at positions at the same distance with different angles.
Figure 15B:
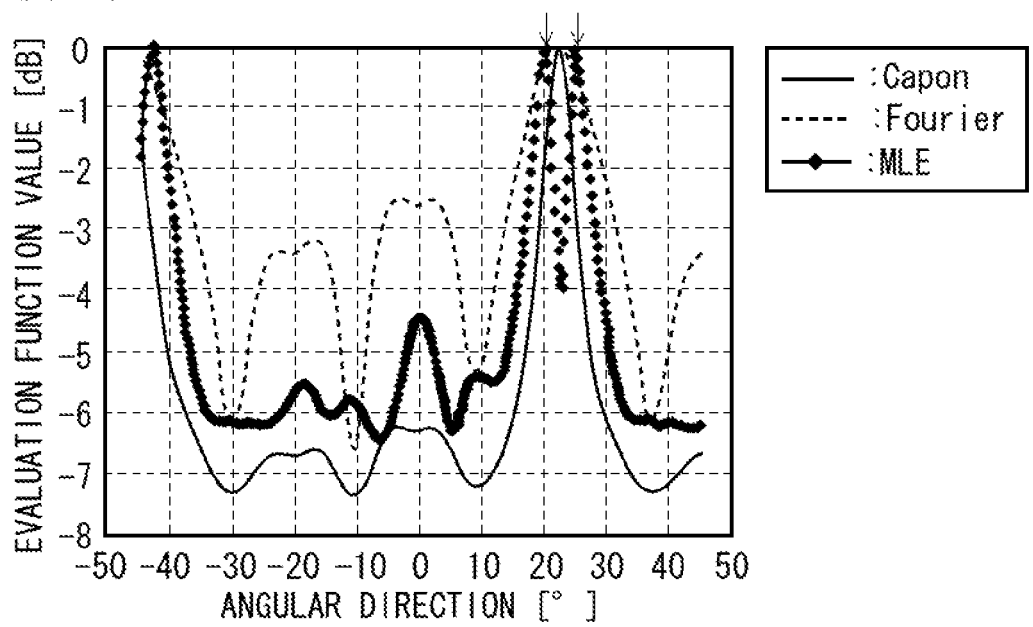

FIGS. 15A and 15B are diagrams showing the estimation simulation result of the direction of arrival when the number of receiving array antenna elements is 4 and two targets are present at positions at the same distance with different angles. The true values of the directions of arrival of the reflected wave signals from the two targets are 0° and 5° in FIG. 15A and 20° and 25° in FIG. 15B.

In FIGS. 15A and 15B, an estimation simulation result of the maximum likelihood estimation (MLE) in the present embodiment for the estimation simulation result of the radar device 1 of the first embodiment shown in FIG. 10C is further shown.

In the present embodiment, reflected wave signals from two targets, which are present within the distance resolution $\Delta R$ of the radar device 1y and have close azimuthal angles (for example, 0° and 5°) from the radar device 1y, can be decomposed with high accuracy by using the maximum likelihood estimation for the estimation of the direction of arrival of the reflected wave signal from the target. As a result, it is possible to improve the estimation accuracy of the direction of arrival of the reflected wave signal from each target. Therefore, since the radar device 1y can improve the estimation accuracy of the direction of arrival of the reflected wave signal from the target further than the radar device 1 of the first embodiment can, it is possible to further reduce the estimation error of the direction of arrival.

In addition, for the main beam direction $\theta(q)$ of the radar transmission beam, the direction-of-arrival estimation unit 23y calculates an evaluation function value of the direction of arrival for a limited selection range of $\theta(q)-BW/2$ to $\theta(q)+BW/2$. Therefore, the number of calculations of the evaluation function value of the direction of arrival of two waves in increments of 1° by the MLE is $[BW \times (BW+1)/2] \times N_{qend}$.

Meanwhile, in the conventional technique, the number of calculations of the evaluation function value of the direction of arrival of two waves in increments of 1° by the MLE using the entire detection range $\theta min < \theta < \theta max$ is $(\theta max - \theta min) \times (\theta max - \theta min + 1)/2$.

By setting $(\theta max - \theta min)$ to the value of about $BW \times N_{qend}$, it is possible to reduce the number of calculations of the evaluation function value of about $(\theta max - \theta min + 1)/(BW + 1)$. For example, if $(\theta max - \theta min) = 61$ and $BW = 6$, it is possible to reduce the amount of calculation to about 1/9. Therefore, it is possible to significantly reduce the amount of processing.

Modification Example of the Second Embodiment

Figure 16:
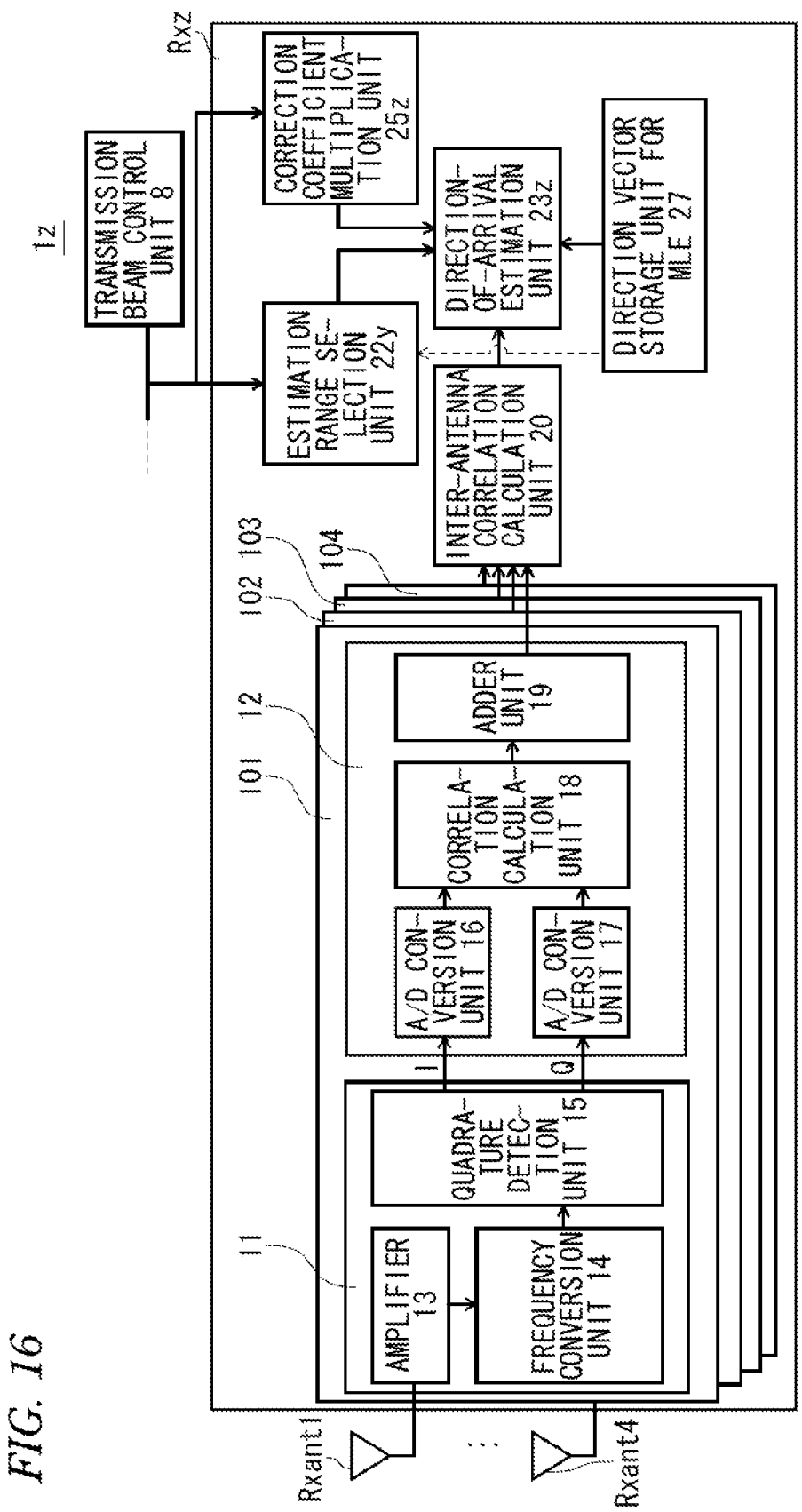
FIG. 16 is a block diagram showing the detailed internal configuration of a radar receiving unit of a radar device of a modification example of the second embodiment.

FIG. 16 is a block diagram showing the detailed internal configuration of a radar receiving unit Rxz of a radar device 1z in a modification example of the second embodiment. In addition, since the configuration of the radar transmitting unit of the radar device 1z is the same as that of the radar transmitting unit Tx shown in FIG. 2, the configuration of the radar transmitting unit of the radar device 1z is omitted in FIG. 16. The radar receiving unit Rxz further has a correction coefficient multiplication unit 25z in the radar receiving unit Rxy shown in FIG. 12. In the explanation of FIG. 16, the same configuration as in the radar receiving unit Rxy shown in FIG. 12 is denoted by the same reference numeral as the reference numeral of each section of the radar receiving unit Rxy, and explanation thereof will be omitted.

In the second embodiment, a gain difference may occur between the signal levels of the radar transmission beams according to the main beam direction $\theta$ of the radar transmission beam due to the deviation between the transmission systems of the transmission antennas or the transmission RF units.

In this modification example, when a gain difference between the signal levels of the radar transmission beams due to the deviation caused between the transmission systems or between the receiving systems cannot be neglected, the radar device 1z corrects the gain difference between the signal levels of the radar transmission beams.

The correction coefficient multiplication unit 25z holds a table of inter-beam gain correction coefficients for correcting the gain difference, which is caused by deviation, for each gain of the signal level of the transmission beam corresponding to the main beam direction $\theta(q)$ of the radar transmission beam. The inter-beam gain correction coefficient in the table is calculated in advance by simulation or measurement.

An instruction from the transmission beam control unit 8 is input to the correction coefficient multiplication unit 25z, and the correction coefficient multiplication unit 25z reads an inter-beam gain correction coefficient $\Delta G(\theta(q))$ corresponding to the main beam direction $\theta(q)$ from the table on the basis of the main beam direction $\theta(q)$ of the radar transmission beam and outputs the inter-beam gain correction coefficient $\Delta G(\theta(q))$ to a direction-of-arrival estimation unit 23z.

The direction-of-arrival estimation unit 23z calculates an evaluation function value $P[\phi_0, \phi_1, k]$ of the direction of arrival of the reflected wave signal according to Expression (20) using the direction vectors $D(\phi_0)$ and $D(\phi_1)$, the direction matrix $Z(\phi_0, \phi_1)$, and the correlation matrix $B(k)$ and the inter-beam gain correction coefficient $\Delta G(\theta(q))$ as an offset value. $\beta$ is a predetermined coefficient. Since subsequent explanation is the same as that in the second embodiment, the explanation will be omitted.

[Expression 20]

$$P[\psi_0, \psi_1, k] = 1/\{\|B^{nc}(k) - \alpha_0 D(\psi_0) - \alpha_1 D(\psi_1)\|^2 + \beta \Delta G(\theta(q))\} \quad (20)$$

In this manner, since the radar device 1z can correct the gain difference between the signal levels of the radar transmission beams due to the deviation caused between the transmission systems or between the receiving systems according to the main beam direction $\theta(q)$ of the radar transmission beam, it is possible to appropriately calculate the evaluation function value of the direction of arrival of the reflected wave signal. Therefore, since the radar device 1z can further improve the estimation accuracy of the direction of arrival of the reflected wave signal from the target, it is possible to further reduce the estimation error of the direction of arrival.

Although the embodiments have been described thus far by reference to the drawings, the invention is, needless to say, not confined to the embodiments. It is manifest that the persons skilled in the art can conceive various alterations or modifications of the embodiments within a category described in connection with the claims and that the alterations or modifications naturally fall within a technical scope of the invention.

This invention is based on Japanese Patent Application (Japanese Patent Application No. 2012-078309) filed on Mar. 29, 2012, the content of which is incorporated herein by reference.

INDUSTRIAL APPLICABILITY

The present disclosure is useful as a radar device capable of improving the estimation accuracy of the direction of arrival of a plurality of targets within the distance resolution with a limited number of antennas by suppressing an increase in the scan time within the azimuth detection range.

REFERENCE SIGNS LIST 1, 1x, 1y, 1z: radar device
2: transmission signal generating unit
31, 32, 3N_Tx: transmission RF unit
4: code generating unit
5: modulation unit
6: LPF
7: D/A modulation unit
11: reception RF unit
12: signal processing unit
13: amplifier
14: frequency conversion unit
15: quadrature detection unit
16, 17: A/D conversion unit
18: correlation calculation unit
19: adder unit
20: inter-antenna correlation calculation unit
21: direction vector storage unit
22, 22y: estimation range selection unit
23, 23x, 23y, 23z: direction-of-arrival estimation unit
25, 25z: correction coefficient multiplication unit
27: direction vector storage unit for MLE
101, 102, 103, 104: antenna system processing unit
Rx, Rxx, Rxy, Rxz: radar receiving unit
Tx: radar transmitting unit

The invention claimed is:

1. A radar device, comprising:
a transmission beam control unit configured to output a control signal indicating a main beam direction of a radar transmission beam changing every predetermined number of transmission periods;
a radar transmitting unit configured to transmit a radar transmission signal using the radar transmission beam of which the main beam direction has been changed on the basis of the control signal; and
a radar receiving unit configured to estimate, using a plurality of antenna system processing units that receive a reflected wave signal obtained by reflection of the radar transmission signal from a target, a direction of arrival of the reflected wave signal from the target,
wherein the radar receiving unit includes:
an inter-antenna correlation calculation unit configured to generate phase difference information due to arrangement of receiving antennas on the basis of outputs from the plurality of antenna system processing units;
an estimation range selection unit configured to select an estimation range of the direction of arrival of the reflected wave signal on the basis of the control signal and a transmission beam width of the radar transmission beam; and
a direction-of-arrival estimation unit configured to estimate a direction of arrival of the reflected wave signal from the target on the basis of each output of the inter-antenna correlation calculation unit and the estimation range selection unit.

2. The radar device according to claim 1,
wherein the radar receiving unit further includes a direction vector storage unit configured to store a direction vector, which includes information of deviation of amplitude and a phase caused between the plurality of antenna system processing units, for each range of the direction of arrival, and
the direction-of-arrival estimation unit is configured to estimate the direction of arrival of the reflected wave signal using the direction vector including an azimuthal direction of the selected estimation range.

3. The radar device according to claim 1,
wherein each of the antenna system processing units includes:
a receiving antenna;
a correlation calculation unit configured to calculate a correlation value between the reflected wave signal received through the receiving antenna and a transmission code included in the radar transmission signal; and
an adder unit configured to add the correlation value a predetermined number of times.

4. The radar device according to claim 1,
wherein the estimation range selection unit is configured to output a range of an approximate transmission beam width of the radar transmission beam around the main beam direction of the radar transmission beam, which is output from the transmission beam control unit, as the estimation range of the direction of arrival of the reflected wave signal.

5. The radar device according to claim 2,
wherein the direction-of-arrival estimation unit is configured to calculate an evaluation function of the direction of arrival on the basis of the direction vector including the azimuthal direction of the estimation range selected by the estimation range selection unit and a correlation matrix, which is output from the inter-antenna correlation calculation unit as phase difference information due to arrangement of receiving antennas, and estimate the azimuthal direction, in which the evaluation function becomes a maximum value, as the direction of arrival of the reflected wave signal.

6. The radar device according to claim 2,
wherein the direction vector storage unit further includes a direction matrix corresponding to the number of targets within the transmission beam width of the radar transmission beam, and
the direction-of-arrival estimation unit is configured to calculate an evaluation function of the direction of arrival on the basis of a correlation matrix output from the inter-antenna correlation calculation unit as phase difference information due to arrangement of receiving antennas, the direction vector including the azimuthal direction of the estimation range selected by the estimation range selection unit, and the direction matrix, and estimate the azimuthal direction, in which the evaluation function becomes a minimum value, as the direction of arrival of the reflected wave signal.

7. The radar device according to claim 5,
wherein the radar receiving unit further includes a correction coefficient multiplication unit is configured to store a correction coefficient for correcting a gain difference of the radar transmission beam occurring for each main beam direction, and the direction-of-arrival estimation unit is configured to calculate the evaluation function using the correction coefficient as an offset value.

\* \* \* \* \*